(12) United States Patent
Ebihara

(10) Patent No.: US 8,793,988 B2
(45) Date of Patent: Aug. 5, 2014

(54) POSITIONING DEVICE THAT PERFORMS RETRACTING ACTION USING AIR BALANCE

(75) Inventor: Kenzo Ebihara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 226 days.

(21) Appl. No.: 13/490,649

(22) Filed: Jun. 7, 2012

(65) Prior Publication Data

US 2013/0042604 A1     Feb. 21, 2013

(30) Foreign Application Priority Data

Aug. 18, 2011 (JP) .................................. 2011-179117

(51) Int. Cl.
*F16D 31/02*     (2006.01)

(52) U.S. Cl.
USPC .................................. 60/404; 60/436; 60/442

(58) Field of Classification Search
USPC ........... 60/403, 404, 406, 407, 409, 418, 436, 60/442
See application file for complete search history.

(56) References Cited

U.S. PATENT DOCUMENTS

| | | | |
|---|---|---|---|
| 5,777,450 A | 7/1998 | Kono et al. | |
| 7,788,819 B2 * | 9/2010 | Hon et al. | ........................ 33/503 |
| 2006/0219095 A1 | 10/2006 | Kawai et al. | |

FOREIGN PATENT DOCUMENTS

| | | |
|---|---|---|
| JP | 59-036690 U | 3/1984 |
| JP | 60149785 U | 10/1985 |
| JP | 8054914 A | 2/1996 |
| JP | 8227307 A | 9/1996 |
| JP | 2006177437 A | 7/2006 |
| JP | 2006214536 A | 8/2006 |

OTHER PUBLICATIONS

Decision to Grant a Patent for Patent Application No. 2011-179117 drafted Feb. 4, 2013.
Office Action Corresponding to JP2011-179117, dated Nov. 13, 2012.

* cited by examiner

*Primary Examiner* — Ned Landrum
*Assistant Examiner* — Logan Kraft
(74) *Attorney, Agent, or Firm* — Lowe Hauptman & Ham, LLP

(57) ABSTRACT

When an excitation of a servo motor is released due to an emergency stop, a power outage, or another operation performed on a positioning device, the positioning device uses air supplied from an air supply source to vary pressure of an air balance, which cancels a self-weight of a vertical axis driven by the servo motor, thereby moving the vertical axis.

9 Claims, 16 Drawing Sheets

DURING EMERGENCY STOP

UPON BRAKE RELEASE

UPON BRAKE ACTUATION

DURING DRIVING OF APPARATUS
(STATE WHERE VALVE IS OPEN)

DURING EMERGENCY STOP
(STATE WHERE VALVE IS CLOSED)

DURING DRIVING OF APPARATUS
(STATE WHERE VALVE IS OPEN)

DURING EMERGENCY STOP
(STATE WHERE VALVE IS CLOSED)

POSITIONING DEVICE THAT PERFORMS RETRACTING ACTION USING AIR BALANCE

RELATED APPLICATIONS

The present application is based on, and claims priority from, Japanese Application Number 2011-179117, filed Aug. 18, 2011, the disclosure of which is hereby incorporated by reference herein in its entirety.

BACKGROUND OF THE INVENTION

1. Field of the Invention

The present invention relates to a positioning device for performing a retracting action, which is mounted to apparatuses such as a machine tool or a three-dimensional measuring device in consideration of safety.

2. Description of the Related Art

A machine tool and a three-dimensional measuring apparatus enable arbitrary positioning control, and may often perform driving at high speed in order to reduce machining time and measurement time. In consideration of safety, these apparatuses are mounted with a function for performing an emergency stop even during driving. An emergency stop of an apparatus occurs when an emergency shutdown of the apparatus is performed manually by pressing an emergency stop switch, when the apparatus automatically stops upon entering an alarm condition due to a servo motor overload or the like, when power supply is lost due to a power outage, and the like. A general emergency stop method involves decelerating all axes, applying braking, and stopping while maintaining positions.

However, an emergency stop performed while respective axes of a machine tool are being driven at high speed is not always safe because inertia causes movement over a certain distance until the axes come to a stop due to braking. With a machine tool during machining, a tool and a workpiece may collide with each other, and with a three-dimensional measuring apparatus during measurement, a probe and a measured object may collide with each other. A method has been proposed for maintaining servo motor control until respective axes come to a complete stop in order to safely stop an apparatus even in a case of an emergency stop during such high-speed driving.

FIG. 24 shows a flow chart of an emergency stop process according to conventional art.

A judgment is made on whether or not an emergency stop is caused by a power outage, and if so, supply of power is started from an uninterruptible power source (UPS), a deceleration stop is performed while maintaining control of respective axes, a retraction is performed to a safe position, and braking is applied to all axes. Subsequently, the emergency stop is completed by suspending control of all axes. With this technique, by maintaining servo motor control until the respective axes come to a complete stop, control of the respective axes is suspended midway through an original drive path, the respective axes are then moved to a safe position, and brakes are actuated. When the power source is lost due to a power outage or the like, control of the respective axes is suspended in a safe manner by receiving supply of power for a certain period of time from a separately-installed uninterruptible power source (UPS) and from regenerative energy due to deceleration (refer to Japanese Patent Application Laid-Open No. 8-54914 and Japanese Patent Application Laid-Open No.

In addition, Japanese Patent Application Laid-Open No. 2006-177437 and Japanese Patent Application Laid-Open No. 2006-214536 disclose a technique related to an air balance structure applied to a mechanism for compensating for a self-weight of a movable part that moves on a vertical axis in a precision machine tool or a precision measuring device.

As disclosed in Japanese Patent Application Laid-Open No. 8-54914 and Japanese Patent Application Laid-Open No. 8-227307 described earlier, when performing an emergency stop, control of respective axes of an apparatus such as a machine tool or a three-dimensional measuring apparatus is maintained, and after the respective axes are stopped midway through an original drive path, the axes are moved to a safe position and brakes are actuated.

When the power source has been lost due to a power outage or the like, the respective axes are stopped in a safe manner by receiving supply of power for a certain period of time from a separately-installed uninterruptible power source (UPS) and from regenerative energy due to deceleration. While this method is superior in terms of safety and versatility, an expensive battery and an expensive regenerative power supply circuit are separately required. In addition, retrofitting a regenerative power supply circuit or the like requires significant modifications to a control circuit or a power supply circuit. Furthermore, for example, when a tool collides with a workpiece and an overload alarm occurs due to an erroneous machining program, maintaining an erroneous tool path prior to stoppage may result in further damage. Furthermore, there is also a problem in that a path cannot be maintained if an acceleration exceeding a driving force of each axis is applied from the outside such as during an earthquake.

SUMMARY OF THE INVENTION

In consideration of the problems found in conventional art described above, it is an object of the present invention to provide a positioning device capable of reliably causing a vertical axis to perform a retracting action without having to rely on external power.

A positioning device according to the present invention comprises: a servo motor that drives a vertical axis; a controller that controls the servo motor; and an air balance that cancels a self-weight of the vertical axis. The positioning device further comprises: an air supply source that supplies air to the air balance; a pressure regulating device that regulates pressure of the air balance using air supplied from the air supply source; and an air balance pressure modifying unit that modifies the pressure of the air balance and moves the vertical axis in a direction which enables avoiding a collision between a structure that moves with the vertical axis and another structure or reducing a collision therebetween, when an excitation of the servo motor is released due to an emergency stop, a power outage, or another operation performed on the positioning device.

According to the present invention, by also utilizing an air balance that is originally mounted to cancel a self-weight of a vertical axis for a retracting action during an emergency stop, the safety of a positioning device can be enhanced in an inexpensive manner.

The air balance pressure modifying unit can be adapted so as to generate a force that is equal to or greater than a thrust of the servo motor due to a pressure variation of the air balance.

According to this embodiment, since the air balance can easily generate a thrust that is equal to or greater than a driving force of the vertical axis, a retracting action at a higher speed than with a controlled retracting action can be achieved. In addition, a safe retracting action is more likely to be achieved even when an external force that exceeds a control driving force is applied such as during an earthquake.

The air balance pressure modifying unit may be a pressure regulating device connected to the air balance.

According to this embodiment, a force that is equal to or greater than a thrust of the servo motor can be generated due to a pressure variation of the air balance.

The air balance pressure modifying unit may be configured from an air tank capable of accumulating a certain amount of air at a pressure that is higher or lower than a pressure of the air balance and a valve, wherein the air tank may be connected to the air balance by a piping via the valve.

When the pressure of the air balance is varied continuously, the vertical axis moves endlessly. However, an excessive retracting action may jeopardize safety. Therefore, a retracting action desirably involves a movement over just a distance necessary to ensure safety. According to this embodiment, when the valve is opened during an emergency stop, the vertical axis performs a retracting action until the interior of the air tank reaches the same pressure as the air balance but does not move any further. In other words, the retracting action can be set to a constant distance.

The vertical axis may include a braking device in which a brake is released when air pressure is supplied and the brake is actuated when air pressure is released, the air supplied to the braking device being supplied via a valve from an air supply having a pressure that is sufficiently higher than the pressure of the air balance, and the valve includes an exhaust port for releasing residual pressure when the valve is closed, and a pipe line may be provided through which residual pressure of the braking device flows into the air balance via the exhaust port when the valve is closed.

According to this embodiment, since the brake is actuated when air is released, the brake is maintained even during a power outage. In other words, while fixing the movable part of the vertical axis and securing safety is an original role of the brake, the brake can be arranged so as to also assume the role of an "air tank" according to the previous embodiment. With an air-driven brake, high-pressure air (residual pressure) accumulates inside the brake or in an intermediate piping, and once the brake is actuated, this air is released. Since a retracting action of the vertical axis is performed by using exhaust air to temporary elevate the pressure of the air balance, a retracting action of the vertical axis can be reliably performed under a brake actuation condition (since no electric signal processing is involved, even in a power outage).

At least one linear axis or a rotary axis may be provided besides the vertical axis, the linear axis or the rotary axis may include a braking device in which a brake is released when air pressure is supplied and the brake is actuated when air pressure is released, the respective valves may open and close simultaneously, and a pipe line may be provided through which residual pressure of the respective brakes flows into the air balance via the exhaust port when the valves are closed.

According to this embodiment, when there are a plurality of axes, all of the residual pressure air discharged from the brakes of the respective axes are guided to the air balance. As a result, since a greater amount of air is sent to the air balance upon brake actuation, a retracting action of the vertical axis may be performed at a higher speed and a greater force may be generated upon retraction.

At least one of air pipings that connect the braking device with the valve can be structured so as to be capable of accumulating air inside the piping.

According to this embodiment, in order to increase the speed of a retracting action of the vertical axis, a flow rate of air that is sent to the air balance upon brake actuation must be increased. In addition, since air accumulated in the air piping between the brake and the valve flows into the air balance via the exhaust port of the valve, the longer or wider the air piping, the greater the amount of air. A same effect may be achieved by connecting a tank to the middle of the air piping and accumulating air in the tank.

The braking device of the vertical axis can be structured so that a throttle valve is attached to a pipe line of air discharged when the brake is actuated and that an actuation time of the brake of the vertical axis is delayed by restricting a flow velocity of the discharged air.

According to this embodiment, when an air supply (compressor) stops due to a power outage, the pressure of the air balance drops to zero. Since the brake of the vertical axis must have enough holding force to support its own weight even in such a case, the brake is provided with an extremely strong holding force. Therefore, when an operation of the brake of the vertical axis is performed at high speed, there is a risk that a retracting action of the vertical axis may be stopped at an insufficient position. In order to solve this problem, by inserting a throttle valve into a brake pipe line and delaying a brake operation for only the vertical axis, it is possible to buy enough time for the vertical axis to retract over a sufficient distance. In addition, while locking the vertical axis by braking during a high-speed retracting action of the vertical axis may cause an impact to be transferred to a movable part or the brake and may result in failure or a decline in accuracy of the apparatus, such results can be prevented by delaying the braking of the vertical axis.

The valve may be a solenoid valve so that when power of the solenoid valve is turned on, air is supplied to the braking device to release the brake, and when the solenoid valve is turned off, the brake is actuated.

According to this embodiment, while the air supply to the brakes of the respective axes is electrically controlled by the solenoid valve, by adopting a system in which the brakes may be actuated when power is turned off, the brakes can be actuated even during a power outage. As a result, the vertical axis automatically performs a retracting action when a power outage occurs.

The air balance can be connected to a secondary side of a precision pressure-reducing valve, and pressure can be regulated so that the pressure of the air balance becomes constant.

According to this embodiment, since a fluctuation of the pressure of the air balance which cancels the self-weight of the vertical axis becomes a load on the servo motor, the precision pressure-reducing valve is necessary for maintaining a constant pressure at all times. The precision pressure-reducing valve is effective even during a power outage as a device for maintaining a same pressure setting value even when a power supply is lost. Furthermore, the pressure of an air balance chamber can be statically determined in a prompt manner with respect to a retracting action of the vertical axis.

By configuring the positioning device according to the present invention as described above, a positioning device can be provided which is capable of reliably causing a vertical axis to perform a retracting action without having to rely on external power.

BRIEF DESCRIPTION OF THE DRAWINGS

The above and other objects and features of the present invention will become apparent from the following description of the embodiments when considered in connection with the accompanying drawings, wherein.

DETAILED DESCRIPTION OF THE PREFERRED EMBODIMENTS

With many machine tools or three-dimensional measuring apparatuses, a tool or a measuring probe is fixed in a vertical posture during machining or measurement. Such an apparatus can likely be stopped safely by instantaneously retracting a vertical axis in an upward direction.

When an air balance is used as a mechanism for canceling a self-weight of the vertical axis, an extremely large force can be generated instantaneously by varying pressure of the air balance. This is utilized for a retracting action of the vertical axis upon an emergency stop.

With an apparatus that uses air pressure for the braking of respective axes as a method of varying air balance pressure upon an emergency stop, exhaust air from the brakes can be used. Since brakes generally remain actuated even without power in consideration of safety, an air pressure-type brake is supplied with air pressure when the brake is released, whereby the air pressure is released when the brake is actuated.

The air pressure for actuating the brakes is turned on/off by a solenoid valve. By guiding air pressure that is released from the brakes of the respective axes at the moment the brakes are actuated to an air balance chamber of the vertical axis, the pressure of the air balance chamber increases and the vertical axis moves upward only at the moment the brakes are actuated. In addition, in order to prevent the brake of the vertical axis itself from being applied before the vertical axis retracts sufficiently, a throttle valve can be attached to a brake piping of the vertical axis in order to delay the actuation of the brake (a timing at which air pressure is released) in comparison to other axes. With this system, a retracting action of the vertical axis can be reliably performed under a brake actuation condition without having to rely on external power and without having to add a new control circuit. In addition, since a piping and a throttle valve are the only parts that need to be newly added, this system is extremely inexpensive and can be readily retrofitted to an apparatus.

Figure 1:
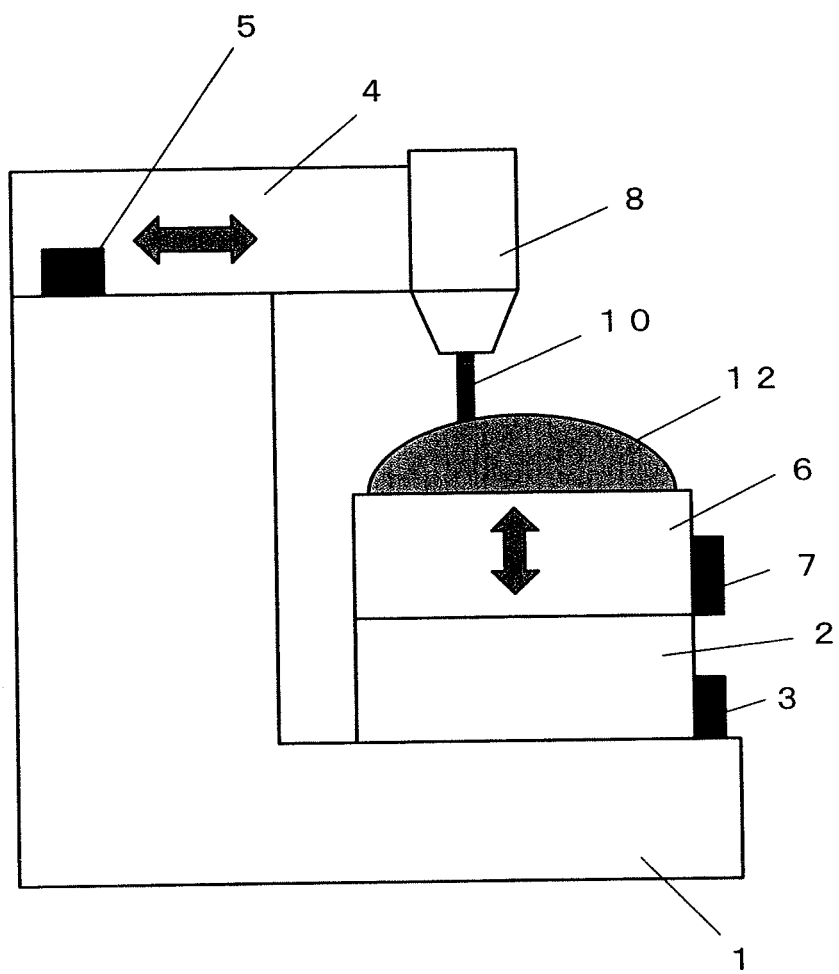
FIG. 1 is a diagram showing a machine tool as an example of a positioning device according to the present invention.

FIG. 1 shows a machine tool as an example of a positioning device.

The machine tool shown in FIG. 1 has a three orthogonal axes configuration mounted with an X axis 2, a Y axis 4, and a Z axis 6. A spindle 8 to which a tool 10 is attached is fixed to the Y axis 4. The Z axis 6 is a vertical axis that extends in a vertical direction. The X axis 2 is arranged on a bed 1, and the Z axis 6 is arranged above the X axis 2. A workpiece 12 is fixed to the Z axis 6. The spindle 8 is attached facing downward in a vertical direction to a tip of the Y axis 4. Using the X axis 2 and the Y axis 4, the tool 10 can be moved in two axial directions of a horizontal plane with respect to the workpiece 12. In addition, using the Z axis 6, the tool 10 can be moved relative to the workpiece 12.

Brakes (an X axis brake 3, a Y axis brake 5, and a Z axis brake 7) respectively mounted to the X axis 2, the Y axis 4, and the Z axis 6 are mechanisms for fixing a movable part of the apparatus to ensure safety. In particular, with an apparatus in which respective axes are driven by a linear motor, since the respective axes become easily movable when control by the linear motor is suspended, brakes are essential for the safety of the apparatus. However, even if equipped with brakes, there is no guarantee that the respective axes of a machine tool can stop safely in a situation where the brakes are actuated when the respective axes of the machine tool are being driven. When the machine tool is in the process of machining of the workpiece 12, the tool 10 and the workpiece 12 may possibly collide with each other. Depending on the severity of the collision, damage to the tool 10 or the workpiece 12 may occur and, in some cases, damage may extend to the spindle 8 or the machine tool itself.

One way to safely stop the respective axes of a machine tool even when the respective axes are being driven is to instantaneously retract the respective axes to positions that enable a collision to be avoided and then using the brakes to stop the respective axes. With the axis configuration of the machine tool shown in FIG. 1, a posture of the tool 10 is always vertical (downward in a vertical direction) and never changes. Therefore, by retracting the Z axis 6 which is a vertical axis and to which the workpiece 12 is fixed downward by a sufficient distance, a clearance between the tool 10 and the workpiece 12 may be increased and a collision can be prevented from occurring.

Figure 2:
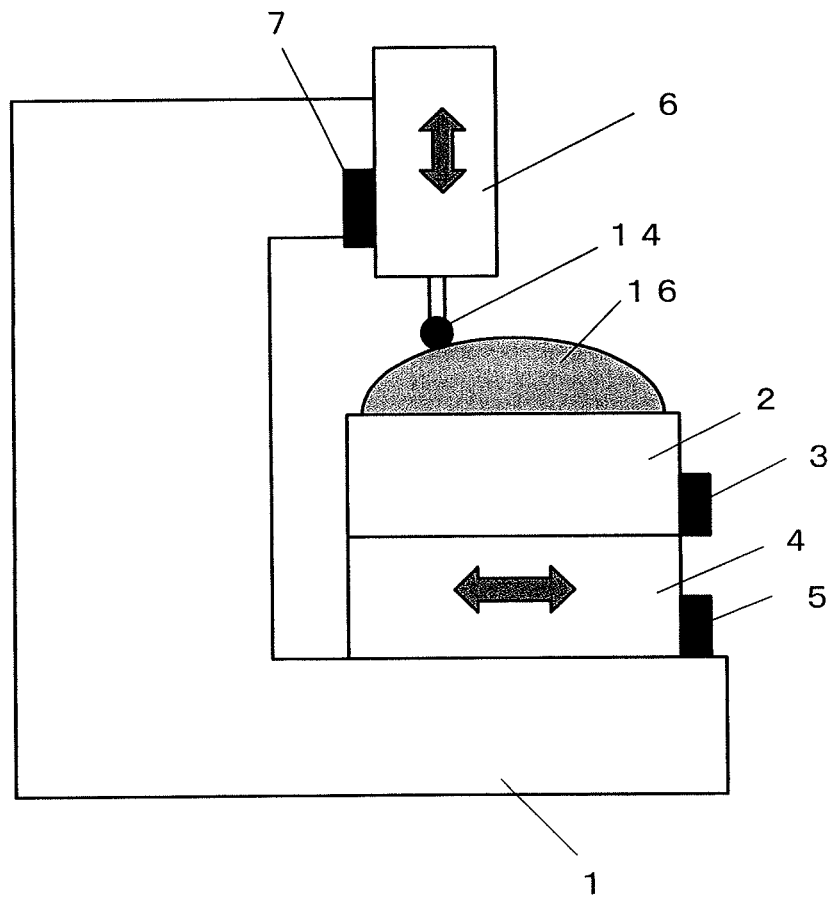
FIG. 2 is a diagram showing a three-dimensional measuring apparatus as an example of a positioning device according to the present invention.

FIG. 2 shows a three-dimensional measuring apparatus as an example of a positioning device.

The three-dimensional measuring apparatus shown in FIG. 2 has a three orthogonal axes configuration mounted with an X axis 2, a Y axis 4, and a Z axis 6. The Z axis 6 is a vertical axis in a vertical direction. A measuring probe 14 is attached facing downward in the vertical direction to the Z axis 6. The Y axis 4 is arranged on a bed 1, and the X axis 2 is arranged above the Y axis 4. A measurement object 16 is fixed to the X axis 2. Using the X axis 2 and the Y axis 4, the measurement object 16 can be relatively moved in two axial directions of a horizontal plane with respect to the measuring probe 14. In addition, using the Z axis 6, the measuring probe 14 can be moved in a vertical direction with respect to the measurement object 16.

Brakes (an X axis brake 3, a Y axis brake 5, and a Z axis brake 7) respectively mounted to the X axis 2, the Y axis 4, and the Z axis 6 are mechanisms for fixing a movable part of the apparatus to ensure safety. In particular, with an apparatus in which respective axes are driven by a linear motor, since the respective axes become easily movable when control by the linear motor is suspended, brakes are essential for the safety of the apparatus.

Even in the case of a three-dimensional measuring apparatus, when an emergency stop is performed during measurement, the measuring probe 14 may possibly collide with the measurement object 16 and become damaged or a collision may cause an accuracy of the three-dimensional measuring apparatus to decline. With the three-dimensional measuring apparatus shown in FIG. 2, a mounting position of the Z axis 6 that is a vertical axis differs from that of the machine tool shown in FIG. 1, and by retracting the Z axis 6 upward (upward in a vertical direction), a clearance between the measuring probe 14 and the measurement object 16 can be increased and the three-dimensional measuring apparatus can be stopped safely.

Figure 3:
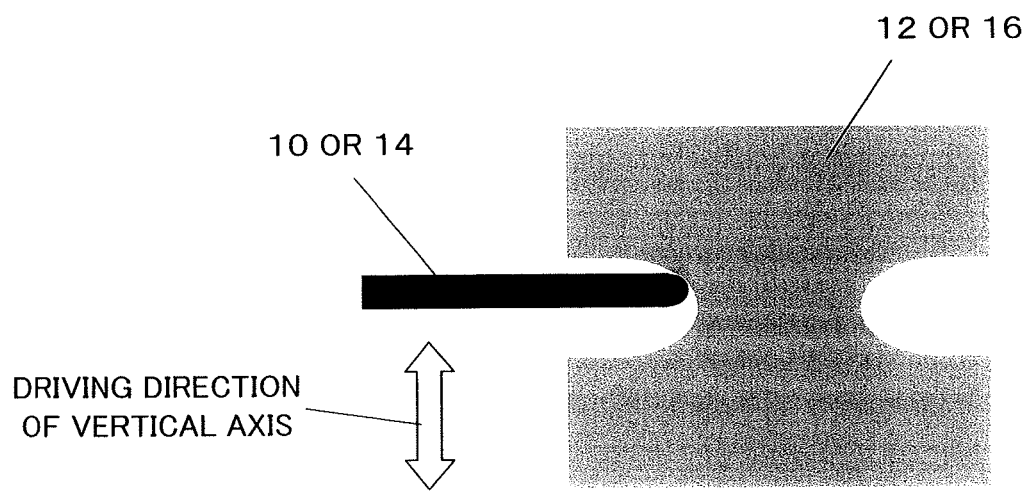
FIG. 3 is a diagram illustrating that a tool or a measuring probe is in a posture in which the tool or the measuring probe is unable to retract from a workpiece or a measured object by a vertical axis alone.

In some cases, the machine tool shown in FIG. 1 or the three-dimensional measuring apparatus shown in FIG. 2 may have an axis configuration which allows not only arbitrary positioning but also arbitrary modification of angles (postures) through the use of a rotary axis. FIG. 3 shows an example in which retraction cannot be performed in a driving direction of a vertical axis.

In a case where a tool 10 or a measuring probe 14 in an edge-on posture is performing machining or measurement on a workpiece 12 or a measurement object 16 shaped as shown in FIG. 3, a retraction in both upward and downward directions of the vertical axis result in a collision. Therefore, the tool 10 or the measuring probe 14 such as that shown in FIG. 3 are in a posture that does not allow the tool 10 or the measuring probe 14 to retract from the workpiece 12 or the measurement object 16 by the vertical axis alone. In this case, the tool 10 or the measuring probe 14 must be retracted from the workpiece 12 or the measurement object 16 in a horizontal direction. In addition, the workpiece 12 or the measurement object 16 such as that shown in FIG. 3 have shapes that do not allow the workpiece 12 or the measurement object 16 to retract from the tool 10 or the measuring probe 14 by the vertical axis alone.

Since various combinations of postures and shapes such as diagonal concave processing are conceivable, enabling a retracting action that accommodates all such combinations not only requires an extremely complicated mechanical structure but also significantly complicates control. However, many machine tools or three-dimensional measuring apparatuses that are actually in use adopt an axis configuration in which the posture of the tool 10 or the measuring probe 14 is fixed in a vertical direction as shown in FIG. 1 or 2. In addition, even with an axis configuration that allows postures to be freely adjusted, a vertical posture is often used in actual machining and measurement.

In consideration thereof, the present invention limits retracting actions of an axis to a retracting action in a vertical direction (up-and-down direction), and an object of the present invention is to provide a positioning device that is particularly capable of readily performing a retracting action of a vertical axis mounted with an air balance.

An example of a vertical axis mounted to a first embodiment of a positioning device according to the present invention will now be described with reference to FIG. 4A (front view) and FIG. 4B (side view).

This positioning device is structured such that a movable part 21 moves in a vertical direction (upward and downward) with respect to a fixed part 20. A pressure regulating device 46 is connected to an air supply (compressor) 44. Compressed air from the air supply 44 is supplied to the pressure regulating device 46 via an air piping 60. The compressed air supplied to the pressure regulating device 46 is supplied to an air balance via a piping 70 connected to the air balance. The air balance will be described with reference to FIG. 5. An electric signal that instructs pressure regulation is inputted from a controller 40 to the pressure regulating device 46 via a pressure regulation signal line 80 and controls operations of the pressure regulating device 46. An emergency stop switch 42 is a switch for manually initiating an emergency shutdown. When the emergency stop switch 42 is pressed, control by the controller 40 is suspended and an emergency stop state is entered.

The first embodiment of the positioning device shown in FIGS. 4A and 4B will be further described with reference to FIG. 5 which presents an A-A cross section of FIG. 4B.

The movable part 21 of the vertical axis has a square box-shape and is structured such that the cuboid fixed part 20 is inserted to an inner face of the movable part 21. A surface at which the movable part 21 and the fixed part 20 come into contact with each other constitutes a bearing surface 22. For example, by adopting an air bearing, the movable part 21 is supported by the bearing surface so that a spacing of several μm is maintained between the movable part 21 and the fixed part 20 (refer to FIG. 21). Since the bearing surface of the air bearing also functions as a fluidic seal, a space enclosed by the fixed part 20 and the movable part 21 constitutes a sealed structure. In order to use the space of this sealed structure as an air balance, an air balance chamber 23 is connected to the pressure regulating device 46 via an air piping 70 that connects to the air balance.

The pressure regulating device 46 is connected to the air supply (compressor) 44 via the air piping 60 and is adapted so as to be capable of arbitrarily regulating pressure inside the air balance chamber 23 (in other words, the pressure regulating device 46 constitutes an "air balance pressure modifying unit"). In this structure, by regulating the pressure regulating device 46 so that the pressure inside the air balance chamber 23 is in balance with a weight of the movable part 21, a self-weight of the movable part 21 can be canceled. The movable part 21 is arranged to be driven by a drive unit (not shown) such as a linear motor so as to be positioned in a vertical direction (upward and downward), and due to the air balance, the movable part 21 can be driven in a near-nonload state. Such a structure is disclosed in Japanese Patent Application Laid-Open No. 2006-177437 and Japanese Patent Application Laid-Open No. 2006-214536 which have been presented earlier as prior art documents.

Figure 4A:
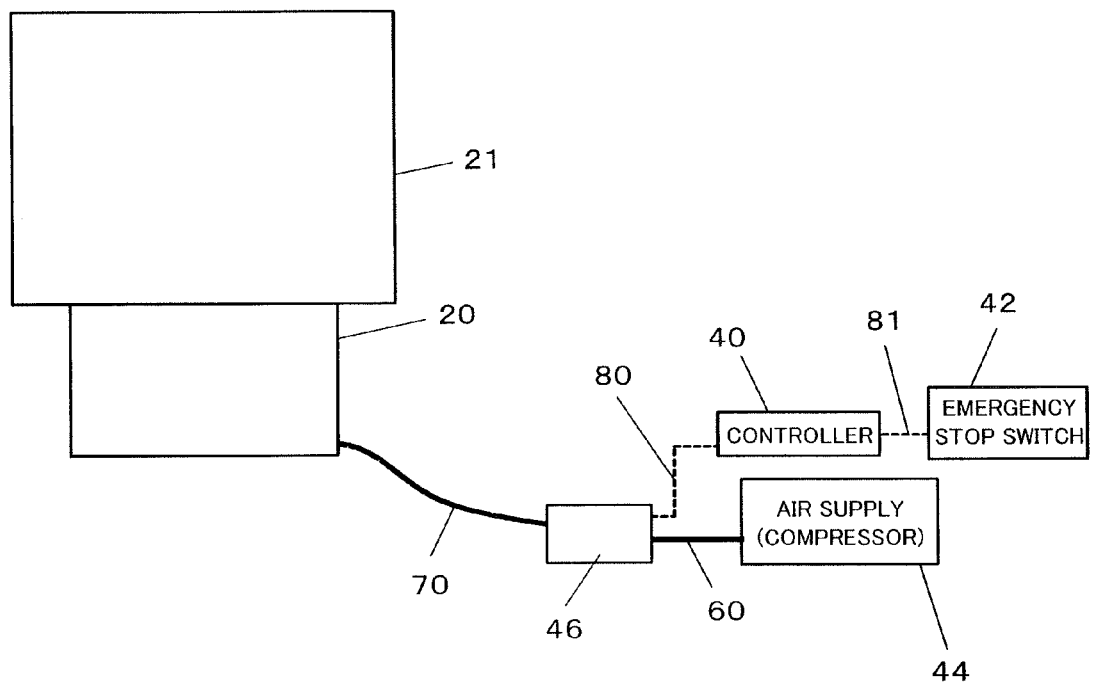
FIGS. 4A and 4B are a front view and a side view showing an example of a vertical axis mounted to a first embodiment of a positioning device according to the present invention.
Figure 4B:
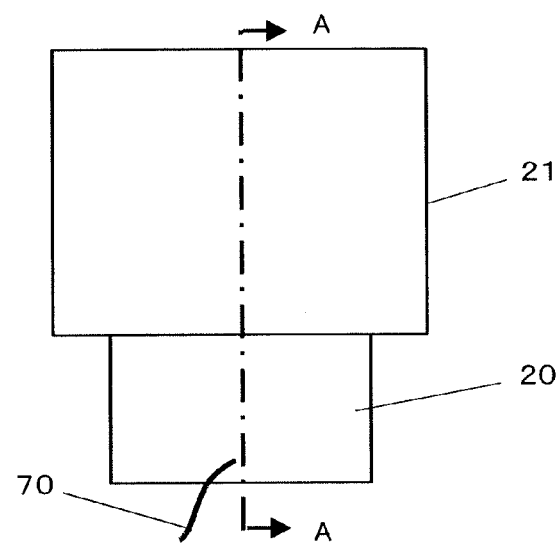
Figure 5:
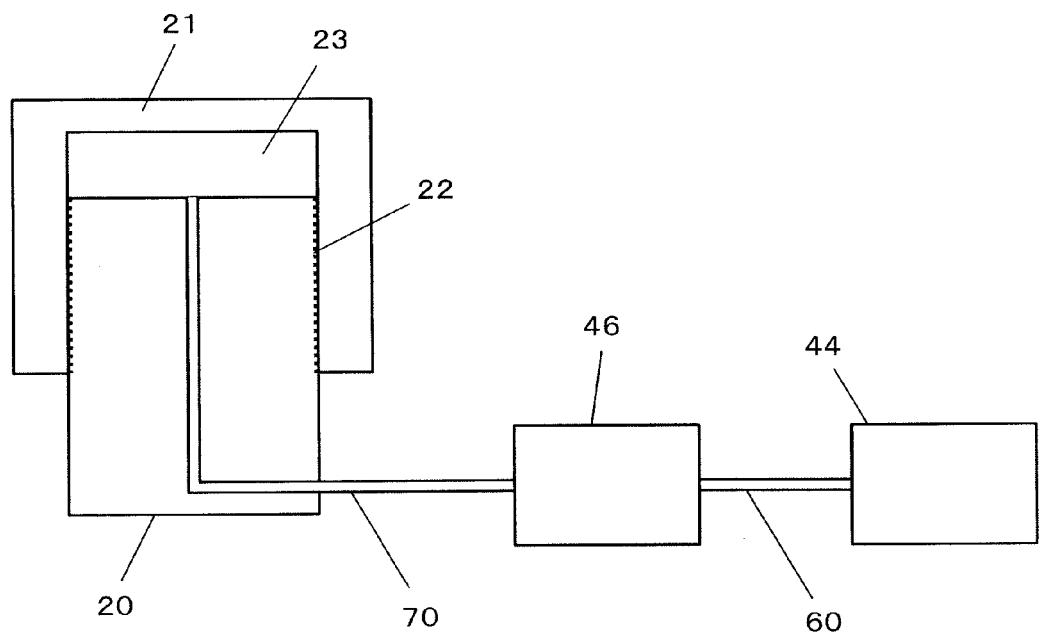
FIG. 5 is a diagram showing an A-A cross section of FIG. 4B.

As described earlier, in the first embodiment of the positioning device shown in FIGS. 4A to 5, the "air balance pressure modifying unit" is constituted by the pressure regulating device 46. For example, when the emergency stop switch 42 shown in FIG. 4A is pressed, a signal that alters pressure is sent from the controller 40 to the pressure regulating device 46, as a result, pressure inside the air balance chamber 23 varies and the vertical axis performs a retracting action. In this manner, in the present embodiment, by using the air balance for a retracting action of the vertical axis, the safety of the positioning device can be enhanced inexpensively without having to add a separate apparatus.

As described above, a system in which an air balance is used for a retracting action of the vertical axis is also advantageous in that a force significantly greater than that of an ordinary servo motor can be generated. A retracting action by a greater force enables even a movable part 21 having a large weight (inertia) to be retracted at a higher speed and contributes to the prevention of a collision involving the movable part 21.

Figure 6:
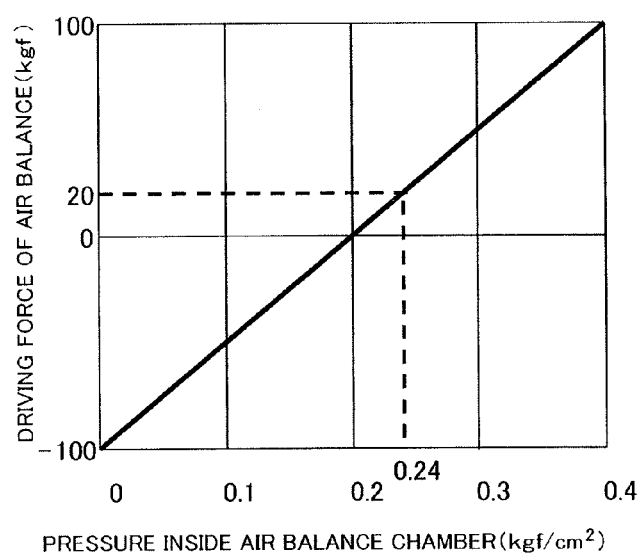
FIG. 6 is a diagram showing an example of a relationship between pressure inside an air balance chamber and a driving force of an air balance.

FIG. 6 is a diagram showing an example of a relationship between the pressure inside the air balance chamber 23 and a driving force of the air balance.

In a case where the movable part of the vertical axis weighs 100 Kg and the air balance chamber 23 has a cross sectional area (an area over which the movable part receives an upward force due to air pressure) of 500 $cm^2$, if the pressure (gauge pressure) of the air balance chamber 23 is 0.2 $Kgf/cm^2$ (=0.02 MPa), then the force that pushes the movable part 21 upward becomes 0.2×500=100 (Kgf) and balances out with the weight of the movable part 21.

When the force that pushes the movable part 21 upward is in balance with the weight of the movable part 21, the driving force of the air balance is zero. When positional control by an ordinary servo motor is performed in such a condition, the self-weight of the movable part 21 or the driving force of the air balance does not impose a load on the motor. As described above, the air balance is advantageous in that by merely increasing pressure by 20% over atmospheric pressure (approximately 1.0 $Kgf/cm^2$ in absolute pressure) as shown in FIG. 6, a large force of 100 Kgf can be generated.

Supposing that a drive mechanism (for example, a linear motor) mounted to the vertical axis has a maximum thrust of 5 kgf, a force equal to or greater than the maximum thrust can easily be generated by varying the pressure of the air balance by 0.01 $Kgf/cm^2$ or more. For example, a retraction of a stationary 100. Kg-movable part by 10 mm requires 0.2 seconds with a maximum thrust of 5 kgf. On the other hand, generating 20 kgf with the air balance enables the retraction of the movable part by 10 mm to be shortened to 0.1 seconds. The pressure required for the air balance to generate a force of 20 kgf is 0.24 $kgf/cm^2$. Therefore, by merely varying the air balance pressure by 20% over the original air balance pressure, an advantage of reducing retraction time by half compared to control of a drive unit can be achieved.

In addition, when a large acceleration acts on the apparatus such as during an earthquake, a force exceeding a maximum thrust of control may easily be applied and, as a result, a retracting action of the movable part may no longer be possible by electric control alone. Even in such a case, an air balance capable of performing a retracting action with a greater force enables a collision of the movable part to be avoided or enables damage due to a collision to be minimized.

A supplementary description of retracting actions of the movable part by electric control and by an air balance will now be provided.

While pressure propagates at the speed of sound, in actuality, a flow rate is restricted due to resistance of intermediate pipe lines and the like that are used in the apparatus. Therefore, it is estimated that the pressure of an air balance reaches maximum in 0.1 seconds (the propagation speed approaches the speed of sound if the intermediate pipe lines are sufficiently wide and short).

On the other hand, with electric control, a maximum thrust can be generated instantaneously. Therefore, when comparing thrust build-up times, a retracting action of the movable part by electric control is reliably faster than a retracting action of the movable part by an air balance. However, as described earlier with reference to FIG. 6, retracting action time is also dependent on maximum thrust. Therefore, the longer the distance of retraction, the more advantageous air balance with greater maximum thrust becomes.

Although various conditions are actually involved, with a generally used machine tool or a three-dimensional measuring apparatus, an air balance is faster (in other words, retracting action time is shorter) if the retraction distance of the movable part is 5 to 10 mm or longer.

With the first embodiment of the positioning device shown in FIGS. 4A to 5, since a pressure setting of the air balance chamber 23 itself is varied by the pressure regulating device 46 upon an emergency stop, a retracting action of the movable part continues unless an original pressure of the air balance chamber 23 is restored. Therefore, after the pressure of the air balance chamber 23 is varied to perform a retracting action over a certain distance, a signal must be outputted from the controller 40 to the pressure regulating device 46 for a sequence of restoring the pressure of the air balance chamber 23 to the original pressure. To this end, an electric signal that instructs pressure regulation is inputted from the controller 40 to the pressure regulating device 46 via the pressure regulation signal line 80 to control operations of the pressure regulating device 46.

An example of a vertical axis mounted to a second embodiment of a positioning device according to the present invention will now be described with reference to FIG. 7. In this embodiment, a retracting action of a constant distance is performed.

A pressure regulating device 46 and an air balance chamber 23 are connected to each other via an air piping 70 that connects to an air balance. The pressure regulating device 46 is connected to an air supply 44 via an air piping 60. A valve 48 is connected to the air supply 44 via an air piping 61, and the valve 48 and the air balance chamber 23 are connected to each other via an air piping 71 that connects to the air balance chamber 23. In addition, the valve 48 is connected to an air tank 50 via an air piping 62. A controller 40 controls opening/closing of the valve 48 and controls the pressure regulating device 46. The pressure regulating device 46 is used exclusively for balancing pressure inside the air balance chamber 23 with a weight of a movable part 21, and is not involved with operations during an emergency stop.

Figure 7:
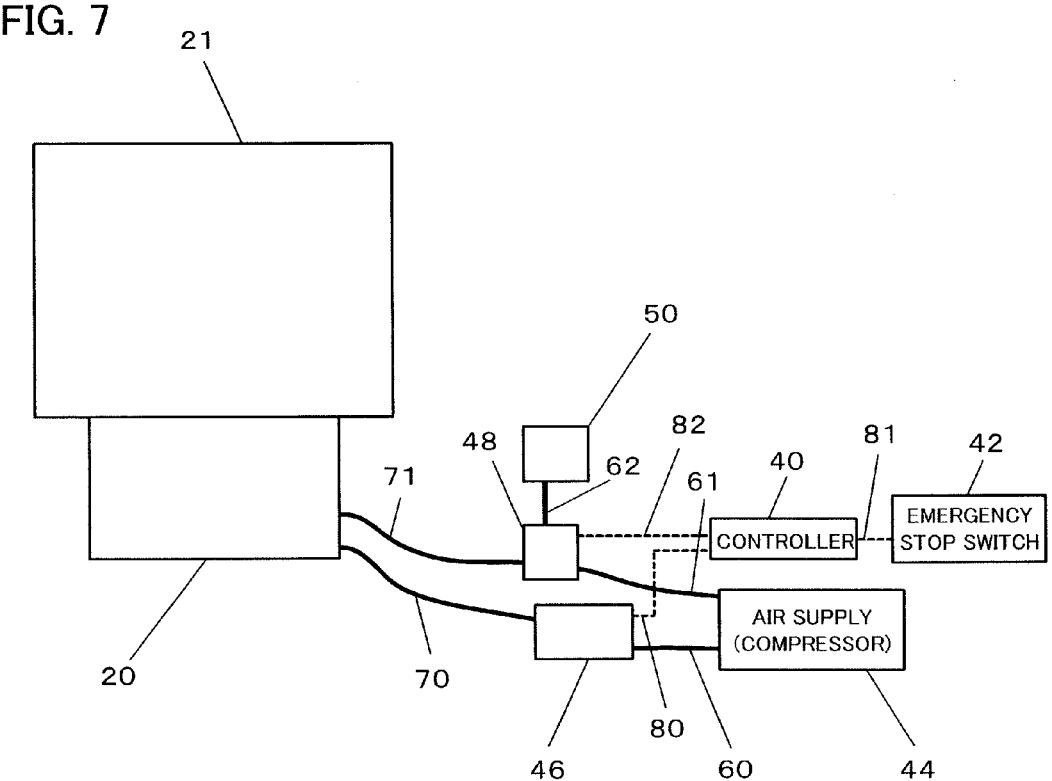
FIG. 7 is a diagram illustrating a second embodiment of a positioning device according to the present invention.
Figure 8:
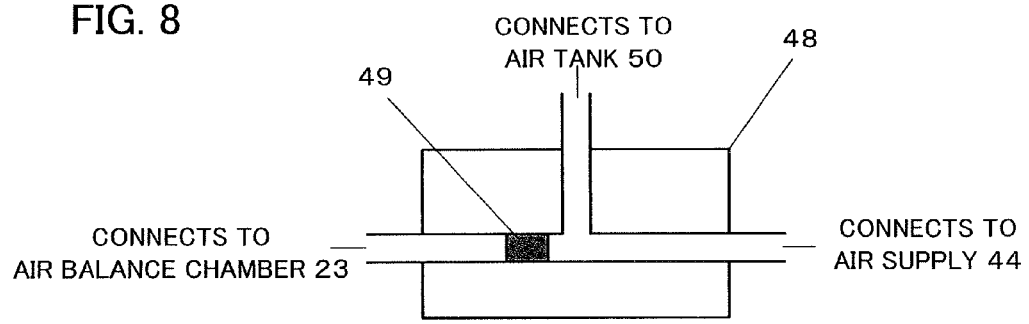
FIG. 8 is a diagram for illustrating a state in which a valve of the positioning device shown in FIG. 7 is connecting an air tank and an air supply to each other due to a stop plug position of the valve.

As shown in FIG. 8, the valve 48 shown in FIG. 7 includes a stop plug 49 and is constituted by three paths, namely, a path connected to the air supply 44, a path connected to the air tank 50, and a path connected to the air balance chamber 23. With the valve 48 connected to the air tank 50, since the stop plug 49 is at a position shown in FIG. 8 when an apparatus having the axis configuration shown in FIG. 2 is being driven, the valve 48 connects the air tank 50 and the air supply 44 with each other as shown in FIG. 2. As a result, the inside of the air tank 50 is at high pressure.

Figure 9:
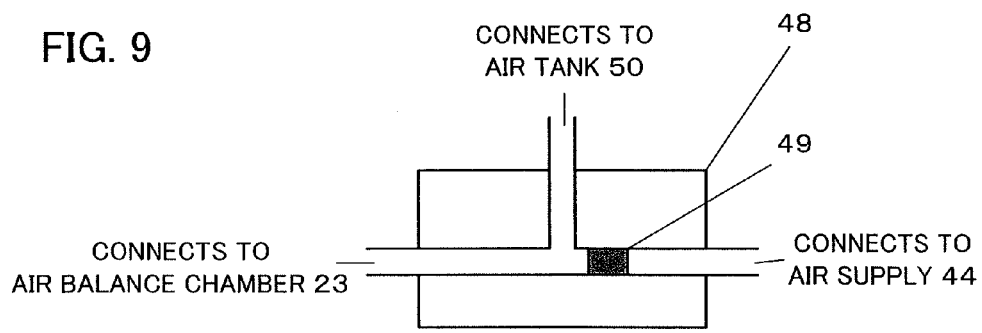
FIG. 9 is a diagram for illustrating a state in which the valve of the positioning device shown in FIG. 7 is connecting an air tank and an air balance chamber to each other due to a stop plug position of the valve.

When an emergency stop switch 42 is pressed, a signal from the emergency stop switch 42 is inputted to the controller 40 via a signal line 81. Upon receiving the signal, the controller 40 inputs an instruction signal to the valve 48 via a signal line 82. By moving the stop plug 49 inside the valve 48 in accordance with the instruction signal, the valve 48 cuts off the supply of high-pressure air from the air supply 44, and connects the air tank 50 and the air balance chamber 23 with each other as shown in FIG. 9. The high-pressure air inside the air tank 50 flows into the air balance chamber 23 via the valve 48 and the air piping 71 that connects to the air balance. Due to the inflow of air, pressure inside the air balance chamber 23 increases temporarily. However, the pressure inside the air balance chamber 23 returns to normal with a retracting action of the movable part 21, and the retracting action of the movable part 21 is completed after a constant distance. For example, if the air tank 50 has a capacity of 0.1 L (liter) and the pressure of the air supply 44 is 0.62 Mpa (absolute pressure 0.72 Mpa), by using the value of the air balance chamber 23 described earlier, when air inside the air tank 50 expands to six times the volume (=0.6 L), pressure drops to ⅙ and becomes equal to the original pressure of the air balance chamber 23 of 0.02 Mpa (absolute pressure 0.12 Mpa). Therefore, 0.5 L of air which corresponds to the expanded volume (a volume obtained by subtracting the original volume of the tank from the volume after expansion) flows into the air balance chamber 23 and the movable part 21 moves by precisely 10 mm which corresponds to the increase in volume.

The embodiment shown in FIG. 7 represents a case where the pressure inside the air tank 50 is set higher than the air balance chamber 23 to retract the movable part 21 upward in a vertical direction. By cutting off the connection between the valve 48 and the air supply 44, the pressure inside the air tank 50 during driving becomes equal to atmospheric pressure. In this case, since the pressure of the air tank 50 is lower than that of the air balance chamber 23, the movable part is to be retracted downward in the vertical direction (the result thereof corresponds to an apparatus with the axis configuration shown in FIG. 1). However, since a pressure difference between the air balance chamber 23 and the air tank 50 is small (approximately 0.2 Mpa), the air tank 50 requires a capacity of 3 L to lower the vertical axis by 10 mm in a retracting action. As shown, a downward retraction of the vertical axis is disadvantageous in that the capacity of the air tank 50 becomes greater.

An example of a vertical axis mounted to a third embodiment of a positioning device according to the present invention will now be described with reference to FIG. 10.

A braking device 25 is attached on a side of a movable part 21 and a brake rail 26 is attached on a side of a fixed part 20. A brake is actuated by air pressure. The braking device 25 is connected to a brake valve 52 via an air piping 72 that connects to the brake. Air from an air supply 44 is supplied to a pressure regulating device 46 and to the brake valve 52 via an air piping 63 that is a branch piping. In addition, the brake valve 52 is connected to an air balance chamber 23 via an air piping 71 that connects to an air balance. The pressure regulating device 46 is connected to the air balance chamber 23 via an air piping 70 that connects to the air balance. A controller 40 controls opening/closing of the brake valve 52 and controls pressure of the pressure regulating device 46. An instruction signal from the controller 40 is inputted to the brake valve 52 via a brake signal line 83. A signal that instructs pressure regulation is inputted from the controller 40 to the pressure regulating device 46 via a pressure regulation signal line 80. In addition, when an emergency stop switch 42 is pressed, an emergency stop signal is inputted to the controller 40 via a signal line 81. Moreover, operations of the brake valve 52 will be described later with reference to FIGS. 12 and 13.

States during brake release and brake actuation of the braking device of the positioning device shown in FIG. 10 will now be described with reference to FIGS. 11A and 11B.

Figure 11A:
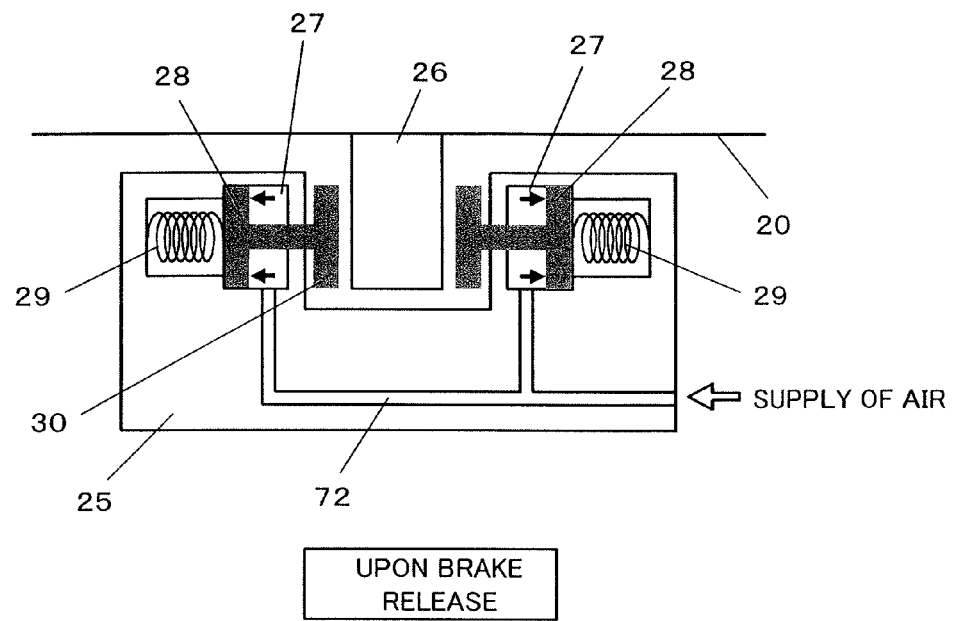
FIGS. 11A and 11B are B-B cross sections of FIG. 10 that respectively illustrate a braking device of the positioning device shown in FIG. 10 upon brake release and upon brake actuation.

When air with sufficiently high pressure is supplied from the air supply 44 to the braking device 25 via the brake valve 52, as shown in FIG. 11A, pressure acts on a piston 28 inside a cylinder 27, a spring 29 shrinks, and the brake is released. Conversely, when air is discharged from inside the cylinder 27, as shown in FIG. 11B, the piston 28 is pushed outward by a force of the spring 29, and as the brake rail 26 is sandwiched from both sides by a brake shoe 30 provided on the piston 28, the brake is actuated.

An advantage of this system is that even if a compressor of the air supply 44 is suspended due to a power outage or the like, braking is maintained by the force of the spring 29. In addition, as shown in FIG. 11A, the braking device 25 is given a bilaterally symmetrical structure with a combination of the cylinder 27, the piston 28, and the spring 29 arranged on the left and right of the brake rail 26 in order to sandwich the brake rail 26 with equal forces from the left and right to prevent a large force from acting on bearings during brake actuation. In particular, the air bearing described earlier with reference to FIG. 5 is an ideal bearing with near-zero friction and with a lower rigidity compared to a rolling bearing and the like. Therefore, since a load does not act on the bearing during brake actuation, the air bearing is desirable as the bearing of this braking device.

Figure 12:
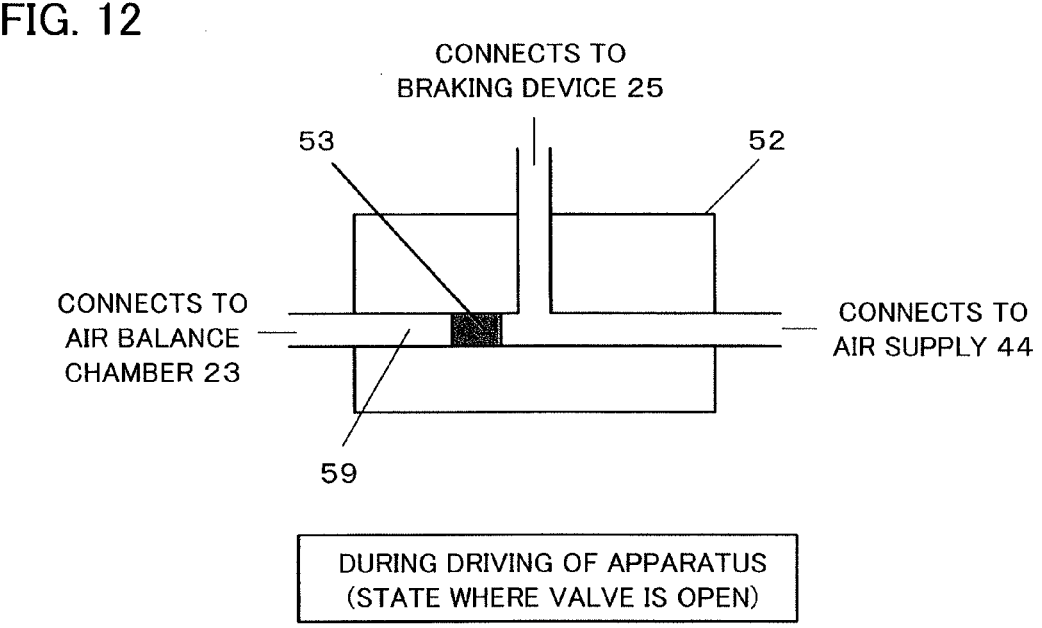
FIG. 12 is a diagram for illustrating that a brake valve of the positioning device shown in FIG. 10 has opened and is in a state in which a machine tool or a three-dimensional measuring apparatus is being driven.

A state in which the brake valve 52 of the positioning device shown in FIG. 10 has opened and is driving a machine tool or a three-dimensional measuring apparatus will be described with reference to FIG. 12.

The brake valve 52 includes a stop plug 53 and is constituted by three paths, namely, a path connected to the air supply 44, a path connected to the braking device 25, and a path connected to the air balance chamber 23, wherein only two among the three paths become connected to each other depending on a position of the stop plug 53. When the apparatus is being driven, the valve is in an opened state, the side of an exhaust port 59 is blocked by the stop plug 53, and the path connected to the air supply 44 and the path connected to the braking device 25 are in communication with each other. At this point, high-pressure air is supplied from the air supply 44 to the braking device 25 and the brake is released.

Figure 10:
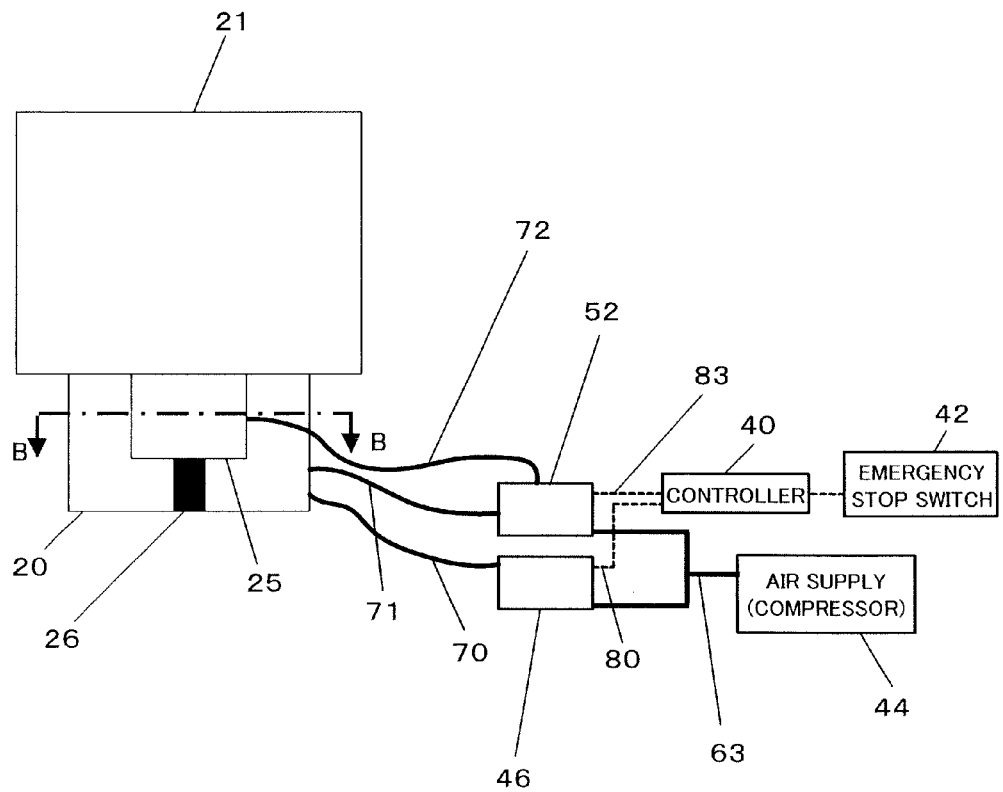
FIG. 10 is a diagram illustrating a third embodiment of a positioning device according to the present invention.
Figure 11B:
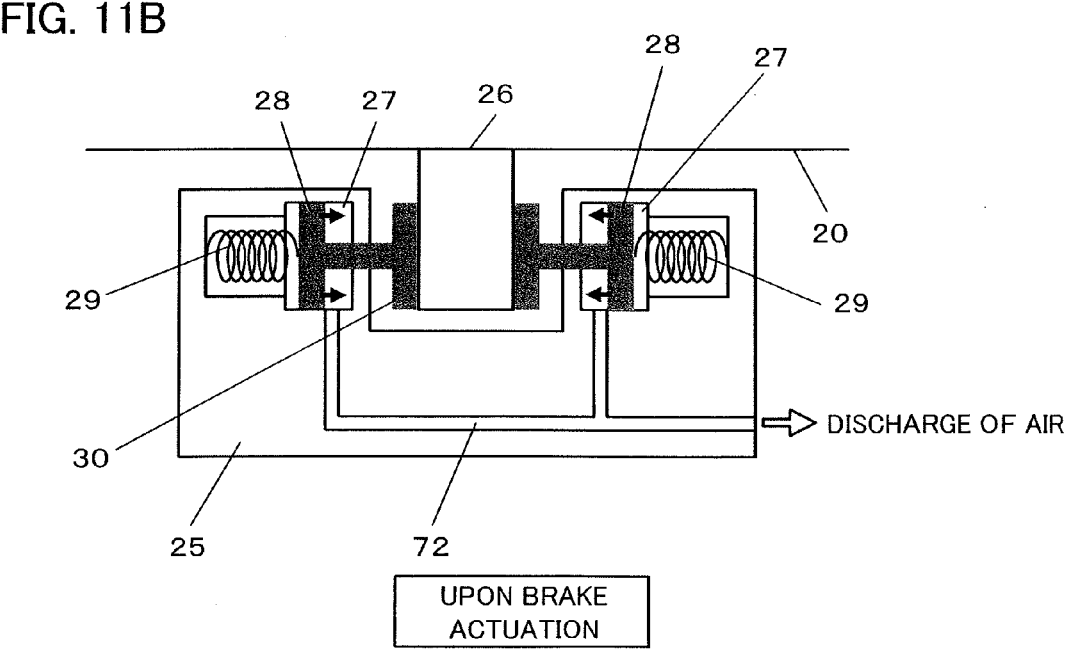
Figure 13:
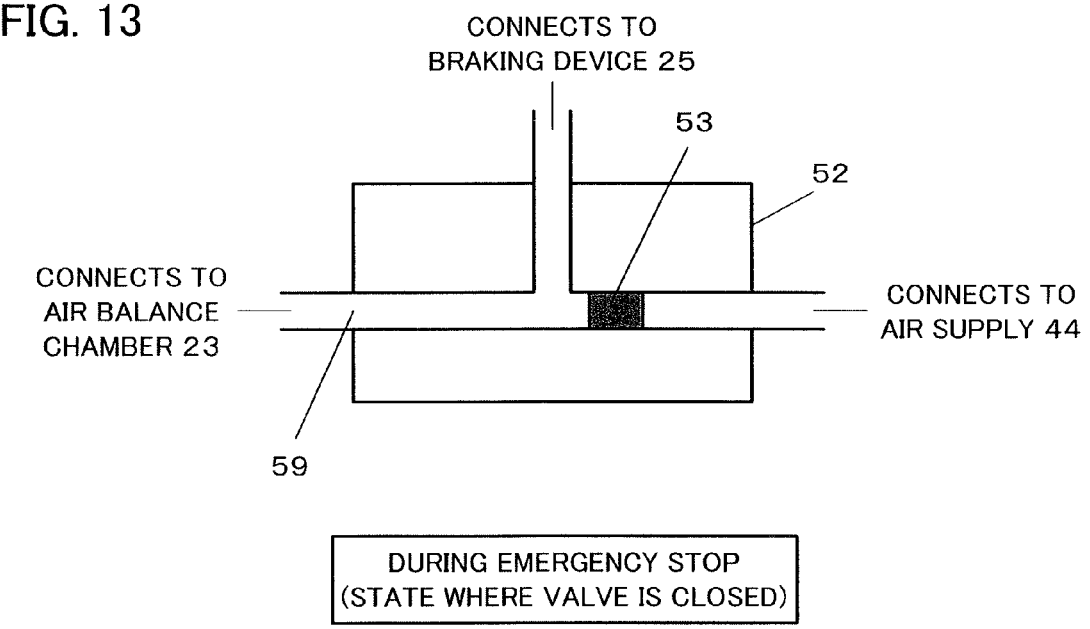
FIG. 13 is a diagram for illustrating that the brake valve of the positioning device shown in FIG. 10 has closed and is in a state in which a machine tool or a three-dimensional measuring apparatus is at an emergency stop.

FIG. 13 is a diagram for illustrating that the brake valve of the positioning device shown in FIG. 10 has closed and is in a state in which the machine tool or the three-dimensional measuring apparatus is at an emergency stop.

During an emergency stop, the valve enters a closed state, the stop plug 53 is at a position that blocks the side of the air supply 44, and the path connected to the braking device 25 and the path connected to the air balance chamber 23 are in communication with each other. In this state, residual pressure on the side of the braking device 25 escapes from the exhaust port and the high-pressure air accumulated on the side of the braking device 25 flows into the air balance chamber 23 with a lower pressure via the exhaust port 59. The air pressure supplied to the braking device 25 eventually drops to a same level as the air balance and, since pressure drops significantly, the brake is actuated.

A space of the cylinder 27 inside the braking device 25 and the air piping 72 (refer to FIG. 10) which connects the brake valve 52 and the braking device 25 correspond to the air tank 50 of the positioning device shown in FIG. 7 (second embodiment) in the sense that they each have capacity for accumulating air. In addition, according to the same principle, the vertical axis performs a retracting action during an emergency stop. In other words, in the positioning device (third embodiment) shown in FIG. 10, the braking device 25 is structured such that in addition to an original role of fixing the movable part 21 of the vertical axis, the positioning device 25 also fulfills a role of supplying air for performing a retracting action to the air balance chamber 23. An advantage of this structure is that an air tank 50 for performing a retracting action of the vertical axis as was the case of the positioning device (second embodiment) shown in FIG. 7 need no longer be separately prepared.

In the first place, the braking device 25 is indispensable as a safety device for fixing the movable part 21. Besides the vertical axis that is affected by gravity, in particular, when the drive unit is a linear motor, a movement occurs easily if excitation of the motor is cut off in a brake-less state. Therefore, a brake is essential for safety reasons. While the structure of the positioning device according to the present invention is premised on the air balance chamber 23 being mounted on the vertical axis, since a brake used in an apparatus that uses air is generally air-driven, a brake structured as shown in FIG. 11 is often adopted. Therefore, a feature of the positioning device according to the present invention is that instead of adopting an air-driven brake for a retracting action of a movable part (vertical axis), the air-driven brake originally mounted to the apparatus which is mounted with the air balance chamber 23 is used for the retracting action.

In addition, another advantage of having the braking device 25 double as the air tank 50 is that the vertical axis performs a retracting action without fail upon actuation of the brake. If the vertical axis is mounted with a brake, a circuit is constituted that causes the brake to actuate when the emergency stop switch 42 is pressed. Generally, in consideration of safety, a brake is designed to stop an apparatus even when power supply is lost due to a power outage or the like. Therefore, the brake remains operational even during a power outage.

A fourth embodiment of a three-dimensional measuring apparatus mounted with three linear axes as an example of a positioning device according to the present invention will now be described with reference to FIG. 14.

The three-dimensional measuring apparatus is mounted with three linear axes, namely, an X axis 2, a Y axis 4, and a Z axis 6. The Z axis 6 that is a vertical axis is mounted with an air balance similar to that shown in FIG. 5, and the brake shown in FIG. 11 and the brake valve 52 shown in FIGS. 12 and 13 (an X axis brake valve 52x, a Y axis brake valve 52y, and a Z axis brake valve 52z) are respectively mounted to the X axis 2, the Y axis 4, and the Z axis 6. In addition, exhaust ports of the three brake valves 52x, 52y, and 52z are connected to an air balance chamber 23 by a common air piping (a piping 71 connected to an air balance). During an emergency stop, all three brake valves 52x, 52y, and 52z are controlled so as to simultaneously enter a closed state (FIG. 13). Moreover, a controller 40 (refer to FIG. 10) controls opening and closing operations of the X axis brake valve 52x, the Y axis brake valve 52y, and the Z axis brake valve 52z.

Figure 14:
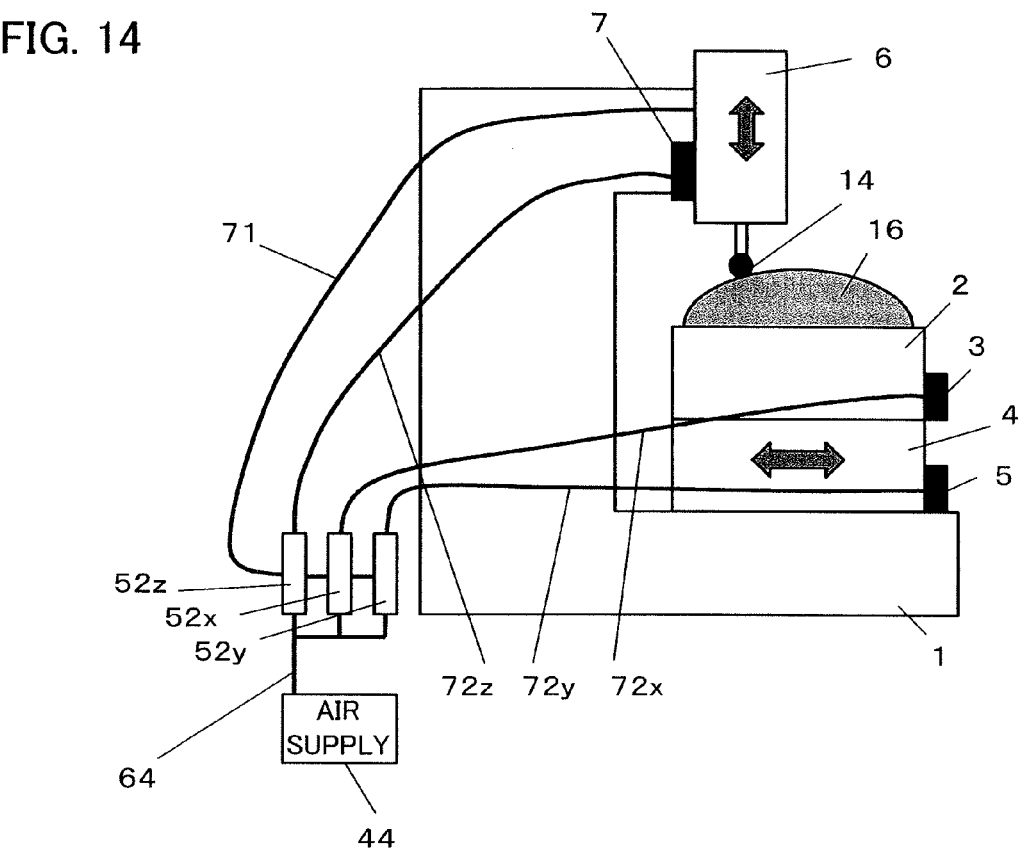
FIG. 14 is a diagram illustrating a fourth embodiment of a three-dimensional measuring apparatus mounted with three linear axes as an example of a positioning device according to the present invention.

Compared to the positioning device shown in FIG. 10 which only has a vertical axis, the three-dimensional measuring apparatus shown in FIG. 14 is mounted with three brakes (an X axis brake 3, a Y axis brake 5, and a Z axis brake 7), exhaust pressure of the respective brakes is discharged from an exhaust port during an emergency stop and, as a result, three times as much air flows into the air balance chamber 23 via the air piping 71 connected to the air balance. As described earlier with reference to the positioning device (second embodiment) shown in FIG. 7, an air tank of 0.1 L is necessary to retract a vertical axis upward by 10 mm using the air balance. However, obtaining a capacity of 0.1 L by a single brake and a brake piping is difficult as was the case of the positioning device (third embodiment) shown in FIG. 10. In consideration thereof, by combining three axes, an allotment to the brake of one axis is reduced to approximately 33 cc (cubic centimeters) which is a realistic capacity.

In addition, while three brake valves 52x, 52y, and 52z are used for three brakes (the X axis brake 3, the Y axis brake 5, and the Z axis brake 7) in the three-dimensional measuring apparatus shown in FIG. 14, if operations of the apparatus other than those during an emergency stop do not require the individual brakes 3, 5, and 7 to be actuated separately, the brakes of the X, Y, and Z axes may be operated simultaneously using only a single valve.

A fifth embodiment of a three-dimensional measuring apparatus mounted with three linear axes as an example of a positioning device according to the present invention will now be described with reference to FIG. 15.

The three-dimensional measuring apparatus is mounted with three linear axes, namely, an X axis 2, a Y axis 4, and a Z axis 6. The positioning device has the same configuration as that shown in FIG. 2. Even with the positioning device according to the present embodiment, as described earlier, capacities in the brake and in the brake piping are important when performing a retracting action of a movable part with an air balance. With an air-driven brake, if only an original brake operation is to be performed, a pressure drop in the piping need not be considered (since no air flows during brake release and brake actuation, there is no pressure drop). Therefore, generally, an air piping with a relatively small inner diameter is used. For example, a brake piping with an inner diameter $\phi$ of 2.5 mm and a length of 2 m has a capacity of 10 cc. Let us assume that the left and right cylinders 27 shown in FIG. 11 have a combined effective capacity of 3 cc. In this case, the capacity of the brake piping and the effective capacity of the left and right cylinders 27 only add up to 13 cc per axis and to 39 cc for the three axes combined.

Figure 15:
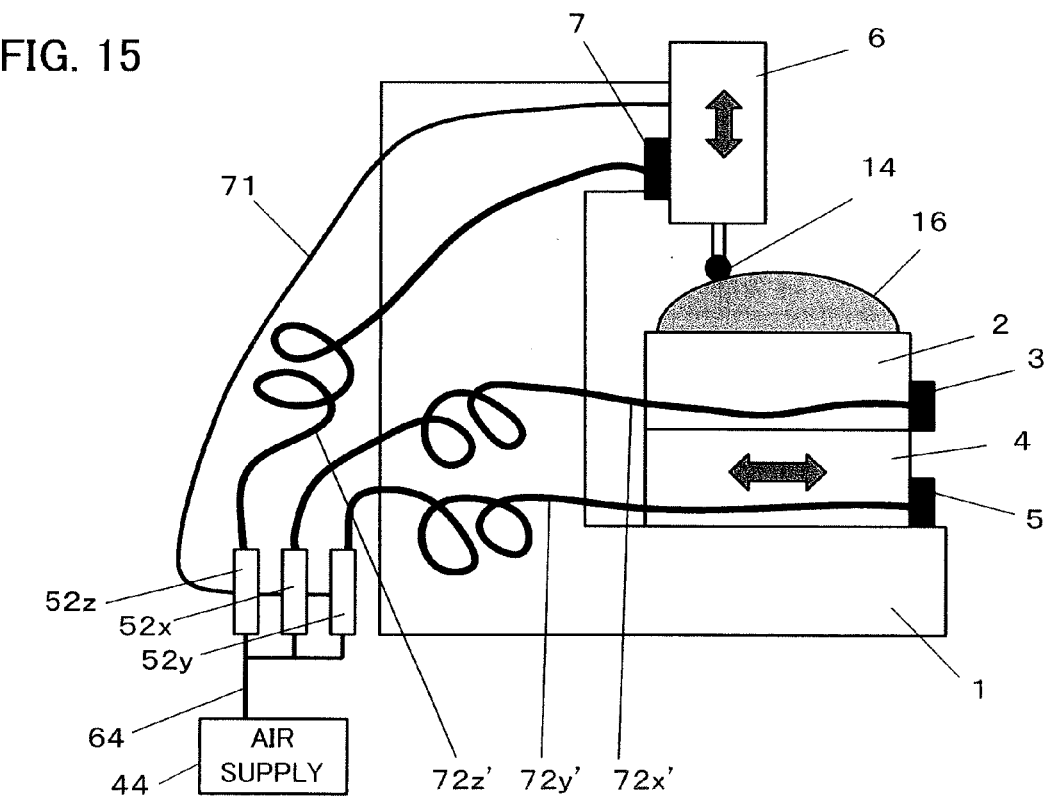
FIG. 15 is a diagram illustrating a fifth embodiment of a three-dimensional measuring apparatus mounted with three linear axes as an example of a positioning device according to the present invention.

In consideration thereof, as shown in FIG. 15, lengths and widths of respective brake pipings 72$x'$, 72$y'$, and 72$z'$ of the X axis 2, the Y axis 4, and the Z axis 6 are increased up to an inner diameter of 4.0 mm and to a length of 2.5 m. In this case, the capacity per axis is increased to 40 cc for a capacity of 120 cc for the three axis combined, which exceeds the necessary capacity 0.1 L described earlier. Moreover, reference character 72$x'$ denotes a thick and long air piping that connects to the X axis brake, 72$y'$ denotes a thick and long air piping that connects to the Y axis brake, and 72$z'$ denotes a thick and long air piping that connects to the Z axis brake.

Figure 16:
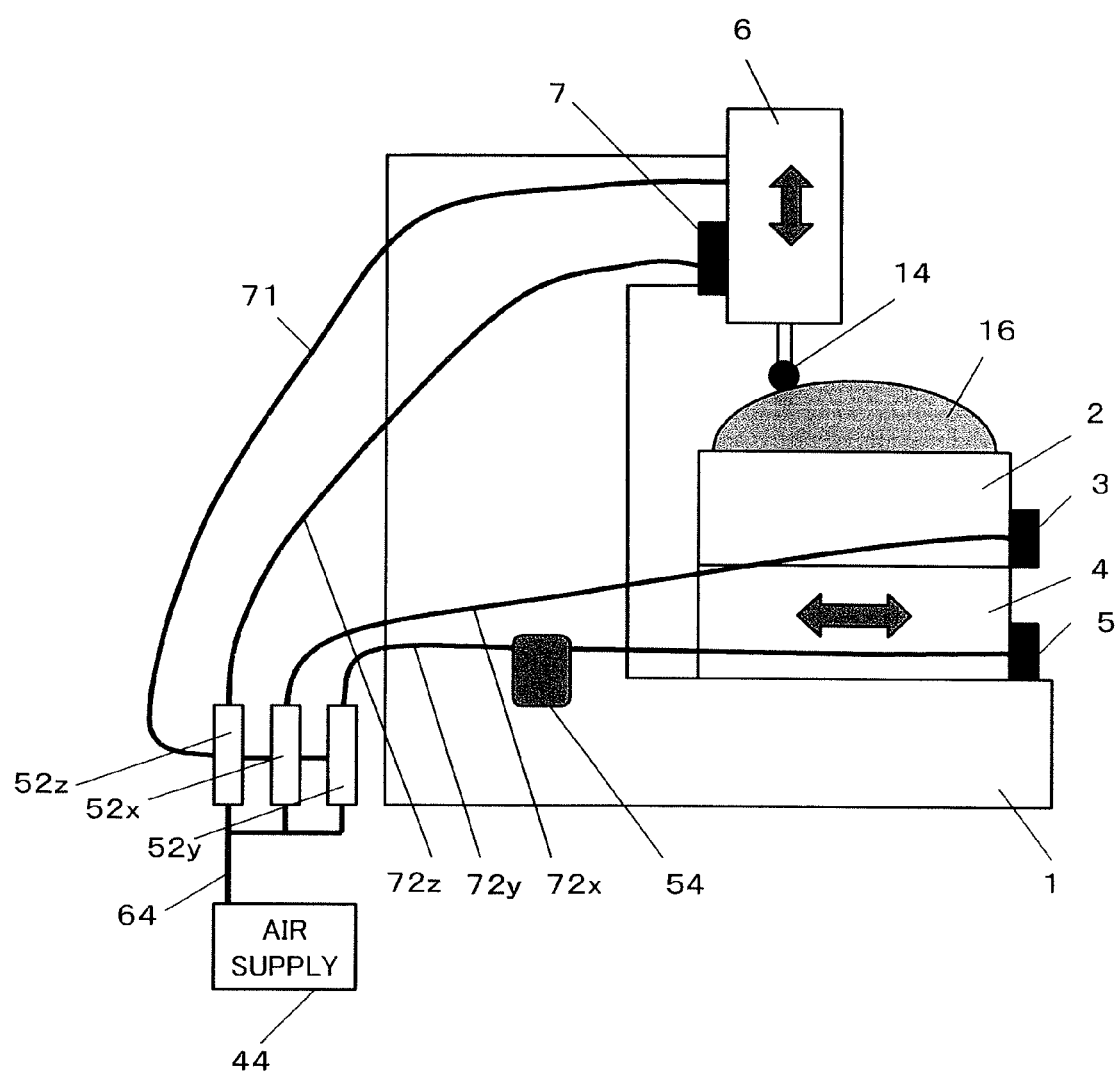
FIG. 16 is a diagram showing a modification of the fifth embodiment in which pipings are unchanged but an air tank has been added to the positioning device (the three-dimensional measuring apparatus mounted with three linear axes) illustrated in FIG. 15.

A modification of the fifth embodiment in which pipings are unchanged but an air tank 54 has been added to the positioning device (the three-dimensional measuring apparatus mounted with three linear axes) illustrated in FIG. 15 is shown in FIG. 16.

While a method of increasing capacity by modifying the brake pipings 72$x'$, 72$y'$, and 72$z'$ so as to be wider and longer as shown in FIG. 15 is inexpensive, not all apparatuses have enough space to accommodate the pipings. Therefore, capacity may be increased in a more direct manner by attaching an air tank 54 midway along a brake piping. In FIG. 16, an 80 cc-air tank 54 is added midway along an air piping 72$y$ that connects to the brake of the Y axis 4. The 80 cc capacity of the tank 54 and the original capacity of 39 cc add up to 119 cc which exceeds the necessary flow rate of 0.1 L.

Figure 17:
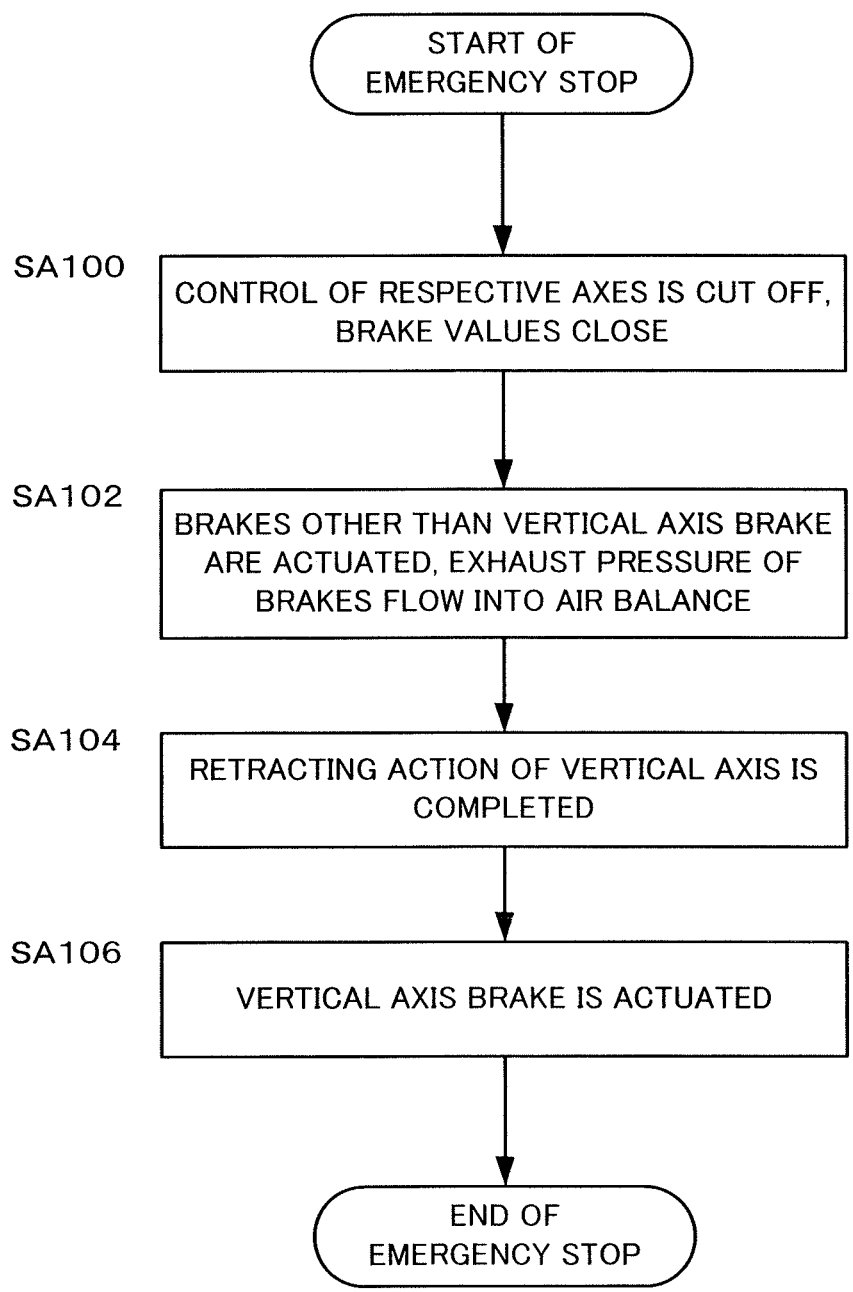
FIG. 17 is a diagram that illustrates, using a flow chart, a necessary sequence from starting an emergency stop process on a positioning device to acting of a brake.

A necessary sequence from starting an emergency stop process on a positioning device to the applying of brakes will now be described using a flow chart shown in FIG. 17.

Valves of the brakes of the respective axes open and close at the same time. Therefore, the brakes of the respective axes are actuated simultaneously. A major concern at this point is a relationship between the time required for the brake of the vertical axis to be actuated and the time it takes for a retracting action of the vertical axis to be completed. In a correct sequence, the brake of the vertical axis is actuated after the retracting action of the vertical axis is completed as depicted by the flow chart shown in FIG. 17. Hereinafter, a step-by-step description will be given.

[Step SA100] Control of each axis is suspended and the brake valve is closed.
[Step SA102] Brakes other than that of the vertical axis are actuated and exhaust pressure of the brakes flow into the air balance.
[Step SA104] The retracting action of the vertical axis is completed.
[Step SA106] The brake of the vertical axis is actuated.

However, from the perspective of the principle of the retracting action described earlier, at the same time the brake valve closes, a retracting action of the vertical axis starts and actuation of the brake also starts. Therefore, the brake is actuated during the retracting action. As described earlier with reference to FIG. 6, an air balance generates an extremely large force. Therefore, if the holding force of the brake is weak, the force generated by the air balance becomes dominant and a retracting action may possibly continue even if the brake is actuated. However, when the usage as a brake of a vertical axis is considered, the brake of the vertical axis is required to at least have enough holding force to support the 100 Kg weight of the movable part even when an air supply is suspended during a power outage and the air balance is completely ineffective. As a result, the holding force of the brake of the vertical axis is strong, and once the brake of the vertical axis is actuated, a retracting action of the vertical axis cannot be performed.

In addition, when powerful braking is applied during a retracting action of the movable part and the movable part is locked, a large impact acts on the movable part and the brake due to a sudden stop. Since this may cause a decline in the accuracy of the apparatus or a failure of the brake, means is required for reliably actuating the brake of the vertical axis after the retraction of the vertical axis is completed.

Figure 18:
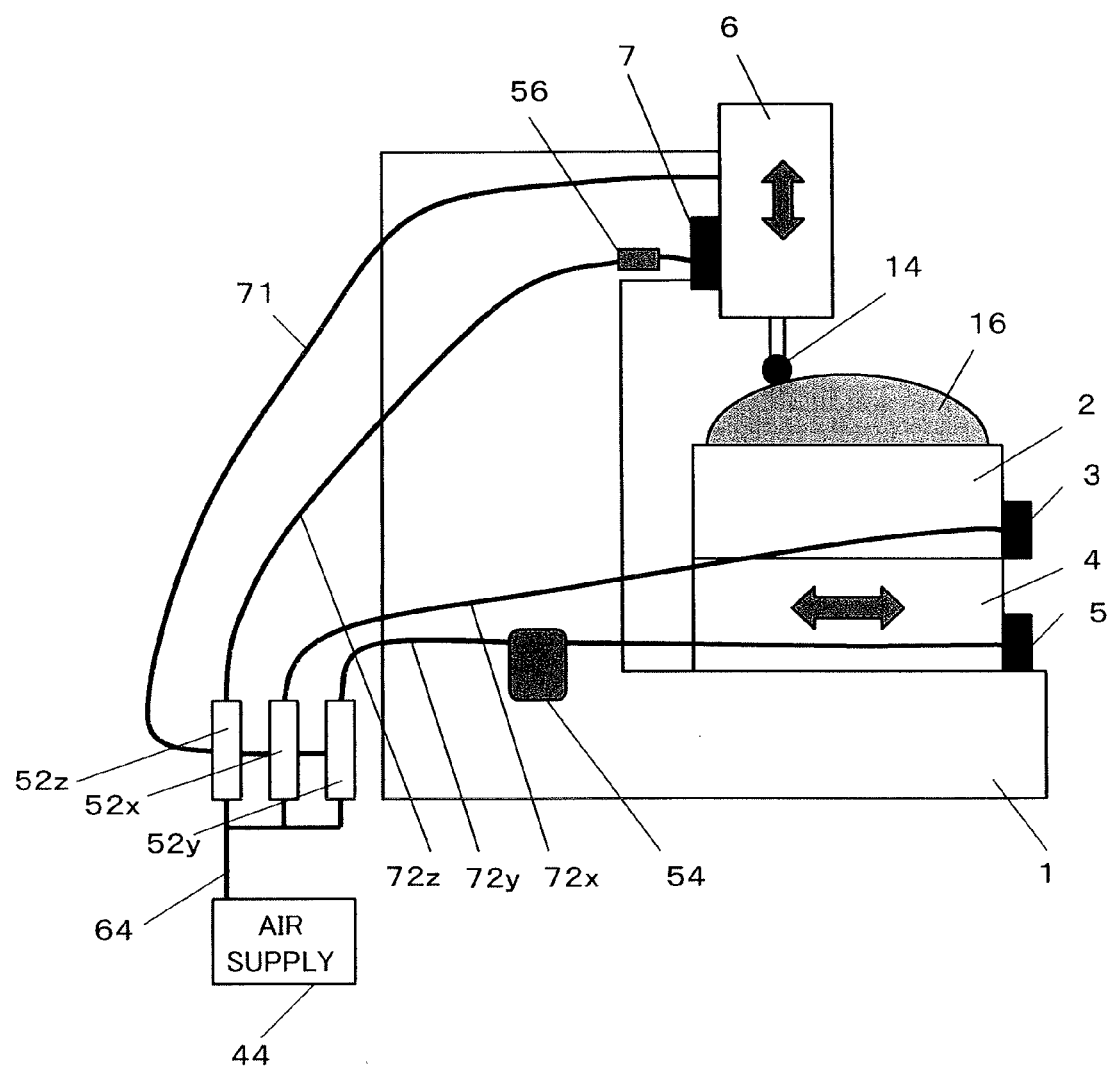
FIG. 18 is a diagram showing a further modification of the fifth embodiment in which a throttle valve 56 has been added to the positioning device (the three-dimensional measuring apparatus mounted with three linear axes) illustrated in FIG. 16.

A further modification of the fifth embodiment in which a throttle valve 56 has been added to the positioning device (the three-dimensional measuring apparatus mounted with three linear axes) illustrated in FIG. 16 is shown in FIG. 18.

The throttle valve 56 is referred to as a speed controller and is capable of restricting flow velocity to or below a certain level. In this case, restricting flow velocity means restricting a flow rate of air that flows per unit time. Using this throttle valve 56, after the brake valve (the Z axis brake valve 52$z$) of the vertical axis (the Z axis 6) is closed, a flow velocity of air flowing out from the cylinder 27 (refer to FIG. 11) of the brake is restricted. By restricting air flow velocity, since pressure inside the cylinder 27 declines gradually over time, the time required for the spring 29 to push the piston 28 to actuate the brake can be delayed.

Since the brake pipings of the axes other than the Z axis 6 that is a vertical axis, namely, the X axis 2 and the Y axis 4, are not provided with the throttle valve 56 described above, as soon as the brake valves (the X axis brake valve 52$x$ and the Y axis brake valve 52$y$) are closed, brakes are actuated and, at the same time, exhaust pressure (exhaust air) of the brakes flow into the air balance chamber 23. By adopting this system, since the brake of the vertical axis (the Z axis 6) can be reliably actuated after a retracting action of the vertical axis (the Z axis 6) is completed, a series of process described in the flow chart of FIG. 17 can be achieved.

Moreover, when an attaching position of the throttle valve 56 is close to the brake of the vertical axis (the Z axis 6) as shown in FIG. 18, since most of the air inside the brake piping is to be used for the retracting action of the vertical axis, no waste is created.

A solenoid valve-configuration of the brake valve 52 (refer to FIGS. 12 and 13) used in the positioning device according to the present invention and a state in which the solenoid valve is opened (a state in which the brake is released) will be described with reference to FIG. 19.

Figure 19:
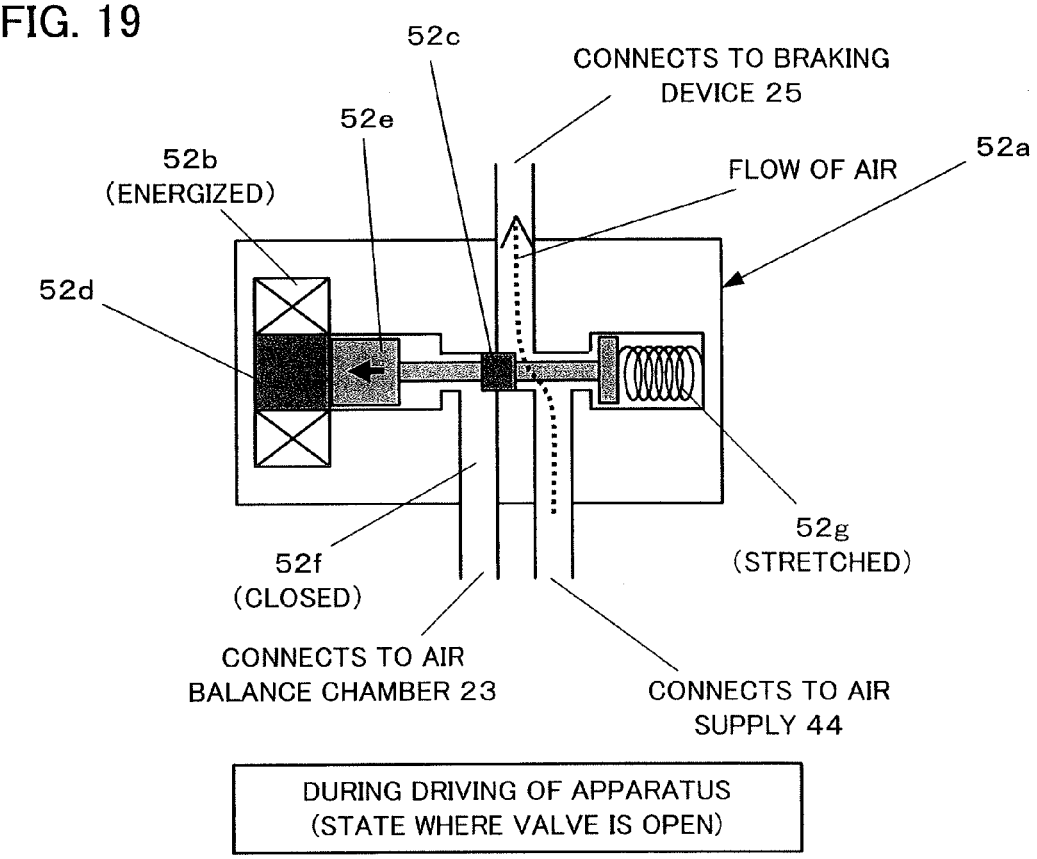
FIG. 19 is a diagram illustrating that the brake valve shown in FIG. 12 or 13 is configured as a solenoid valve and that the solenoid valve is in an opened state.

A brake solenoid valve 52$a$ shown in FIG. 19 generally opens and closes a valve 52$c$ by energizing an internally mounted coil 52$b$. When the coil 52$b$ is energized, a fixed iron core 52$d$ becomes an electromagnet and attracts a movable part iron core 52$e$. As a result, the valve 52$c$ moves toward the left as shown in FIG. 19 and an exhaust port 52$f$ closes. At the same time, an air supply 44 and a pipe line of a braking device 25 become connected to each other, and as air is supplied from the air supply 44 to the brake as indicated by a dashed line arrow, the brake is released.

Figure 20:
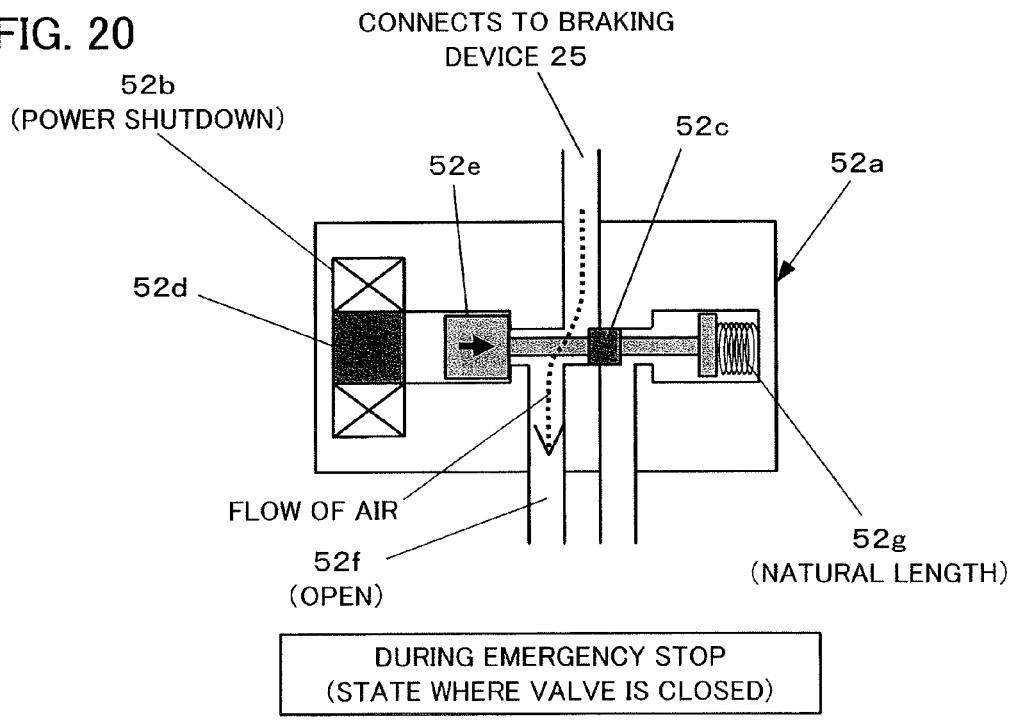
FIG. 20 is a diagram illustrating a state in which the brake solenoid valve shown in FIG. 19 is closed and the brake is being actuated.

FIG. 20 shows a state in which the brake solenoid valve 52$a$ shown in FIG. 19 is closed and the brake is being actuated.

When the power supply to the coil 52$b$ is shut down, the fixed iron core 52$d$ becomes demagnetized, and the valve 52$c$ is pulled back to the right as shown in FIG. 20 by an internal spring 52$g$. Once the valve 52$c$ arrives at a position shown in FIG. 20, exhaust pressure of the braking device 25 flows into the air balance chamber 23 via the exhaust port 52$f$.

Since the solenoid valve 52$a$ invariably enters the state shown in FIG. 20 when the power supply is lost, the solenoid valve 52$a$ enters a closed state during a power outage. Therefore, even when a state is entered in which all power and signals of a controller and the like are cut off due to a power outage or the like, the solenoid valve 52$a$ closes and the vertical axis invariably performs a retracting action. This means that a series of processes of an emergency stop depicted by the flow chart shown in FIG. 17 is automatically executed without requiring a power supply. As a result, a highly reliable retracting action of the vertical axis can be achieved.

An example of a vertical axis mounted to a sixth embodiment of a positioning device according to the present invention will now be described with reference to FIG. 21.

Air is supplied to a piping 76 provided on a movable part 21 from an air supply 44 via a piping 75. Air supplied to an air bearing is discharged into an air balance chamber 23. In addition, the air supply 44 also supplies air to a brake solenoid valve 52a of a vertical axis via an air piping 73. The brake solenoid valve 52a is connected to a brake via a brake air piping 72. In addition, an exhaust port of the brake solenoid valve 52a is connected to the air balance chamber 23 via a piping 74.

A secondary side 58d of a precision pressure-reducing valve 58 is connected to the air balance chamber 23 via a piping 78. The exhaust port of the brake solenoid valve 52a is connected to an air balance via the piping 74. Reference numeral 76 denotes a piping of an air bearing. Reference numeral 77 denotes exhaust air from the air bearing (into the air balance chamber 23). Reference numeral 78 denotes a piping that connects the air balance and the secondary side (58d) of the precision pressure-reducing valve (58) with each other.

Regarding the retracting action of the vertical axis during a power outage described earlier, a premise is required that a pressure regulating device 46 (for example, the pressure regulating device 46 shown in FIG. 10) that controls the pressure of the air balance continues to maintain the pressure of the air balance even during a power outage. A pressure regulating device 46 that discharges the air inside the air balance chamber 23 upon a power outage is incapable of performing a retracting action of the vertical axis.

The precision pressure-reducing valve 58 is a pressure regulating device 46 capable of maintaining a constant pressure without having to use power. The precision pressure-reducing valve 58 is generally used to take in high-pressure air from a primary side 58b, and by manually turning an regulating knob 58a, outputs regulated air from the secondary side 58d. However, in a case where the air balance is sealed by an air bearing such as with the positioning device shown in FIG. 5, since air (exhaust air of the air bearing) is constantly being supplied to the air balance chamber 23 from a sealed part, the air supply to the primary side 58b of the precision pressure-reducing valve 58 is not required as shown in FIG. 21. In other words, the primary side 58b may be blocked. The precision pressure-reducing valve 58 in this case performs an operation to discharge excess air of the air balance from the exhaust port 58c of the precision pressure-reducing valve 58 in order to keep the air pressure of the secondary side 58d constant. A valve capable of controlling the pressure of the secondary side 58d with precision is particularly referred to as a "precision pressure-reducing valve" and is used for applications such as an air balance in which even the slightest pressure variation is not allowed. Moreover, in an apparatus in which a weight of the vertical axis that is a movable part fluctuates, a stepping motor (not shown) may be attached to the regulating knob 58a of the precision pressure-reducing valve 58 to automatically control the pressure of the secondary side 58d according to the weight of the vertical axis so that a motor load of the vertical axis becomes minimum. Since a position of the stepping motor is retained within its resolution range even when a power supply is cut off, a pressure setting of the precision pressure-reducing valve 58 is maintained.

When a power outage occurs, even though the air supply 44 such as a compressor is also suspended, supply pressure conceivably does not immediately drop to zero and the supply continues for at least another several seconds due to air accumulated in the compressor main body or in intermediate pipings. Therefore, a constant pressure of the air balance chamber 23 immediately after a power outage is maintained for at least several seconds by the precision pressure-reducing valve 58. The process of the retracting action of the vertical axis upon an emergency stop shown in the flow chart of FIG. 17 is completed in 1 to 2 seconds, and after the brake of the vertical axis is actuated, a movable part position does not move even when the air balance pressure completely drops to zero. Therefore, by providing the precision pressure-reducing valve 58, a retracting action of the vertical axis can be reliably executed during a power outage even from the perspective of air pressure.

At the movable part 21 held by an air bearing which is a friction-less bearing, by instantaneously varying the pressure inside the air balance chamber 23 which is a sealed space, the air balance behaves as an air spring. Assuming that the movable part 21 of the vertical axis is completely free of attenuating elements, a distance of a retracting action, a velocity of the movable part 21, and a driving force of the air balance vary in sine waves and have a phase relationship illustrated by a graph in FIG. 22.

Figure 22:
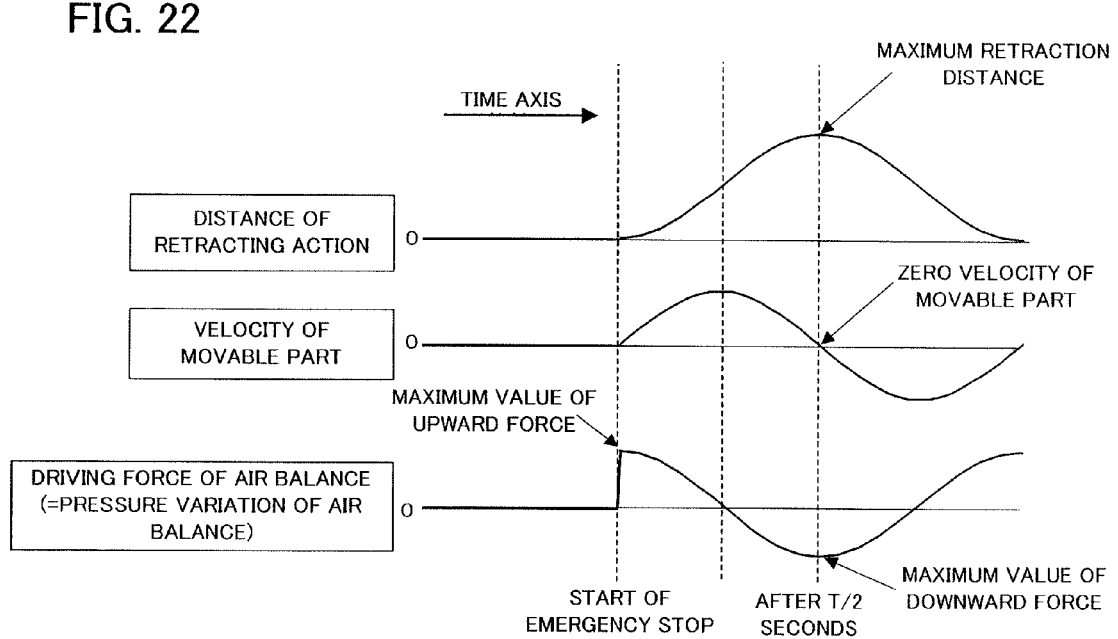
FIG. 22 is a graph illustrating that a distance of a retracting action, a velocity of a movable part, and a driving force of an air balance vary in sine waves.

As is apparent from FIG. 22, since the velocity of the movable part 21 is zero when the retraction distance is at maximum, it seems that an actuation time of the brake is favorably delayed using the throttle valve 56 shown in FIG. 18 so that the brake of the vertical axis is actuated at this instant. However, if a period of the sine wave is denoted as T seconds, since T is, in reality, a short period of time in the order of 0.3 to 0.6 seconds, the aforementioned timing at which the brake is to be applied may be expressed as T/2=0.15 to 0.3 seconds later. Attempting to target the actuation of the brake at this instant is unrealistic. In addition, at a timing of T/2 seconds later, the driving force of the air balance is at maximum downward, which is another reason why actuating the brake from this state is not favorable.

Figure 21:
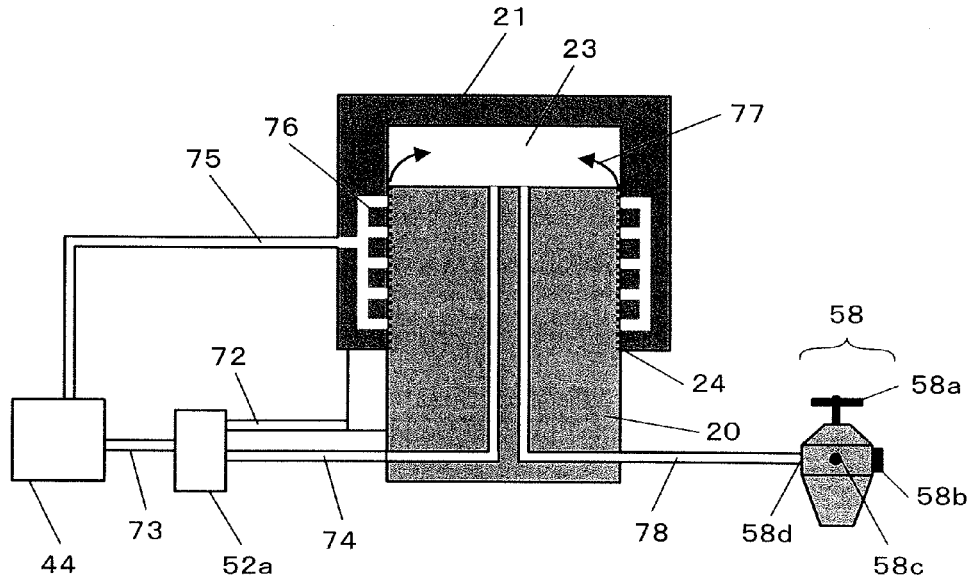
FIG. 21 is a cross sectional view showing an example of a vertical axis mounted to a sixth embodiment of a positioning device according to the present invention.
Figure 23:
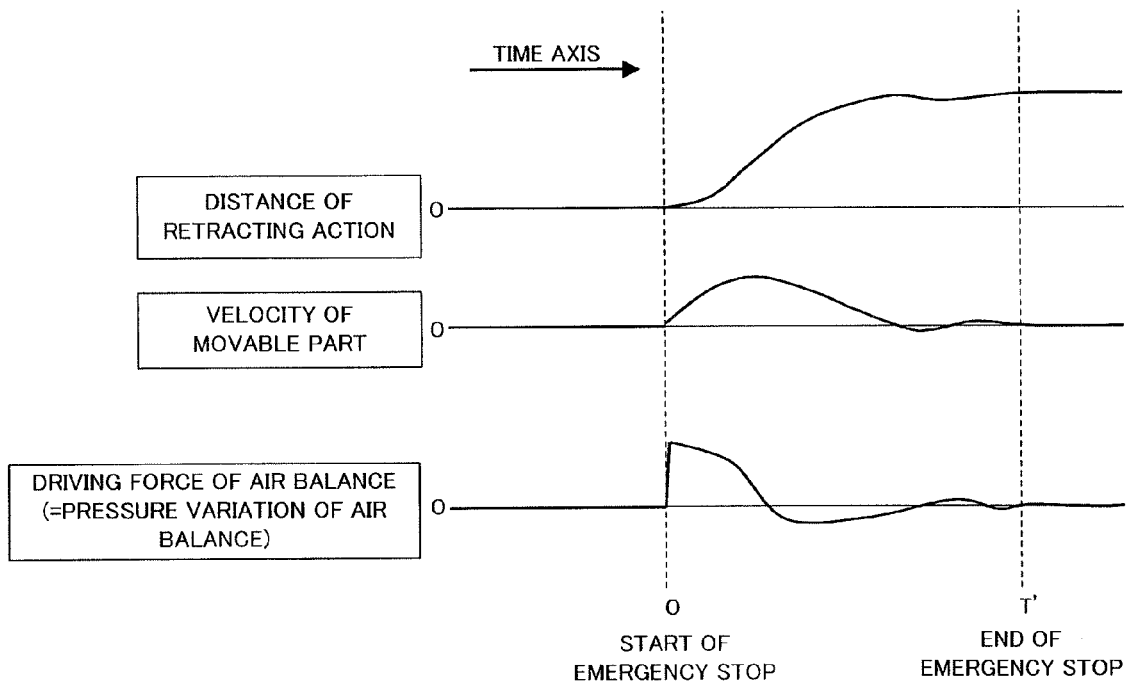
FIG. 23 is a graph illustrating variations in a retracting action, a velocity, and a driving force in a state in which a precision pressure-reducing valve is connected to an air balance.
Figure 24:
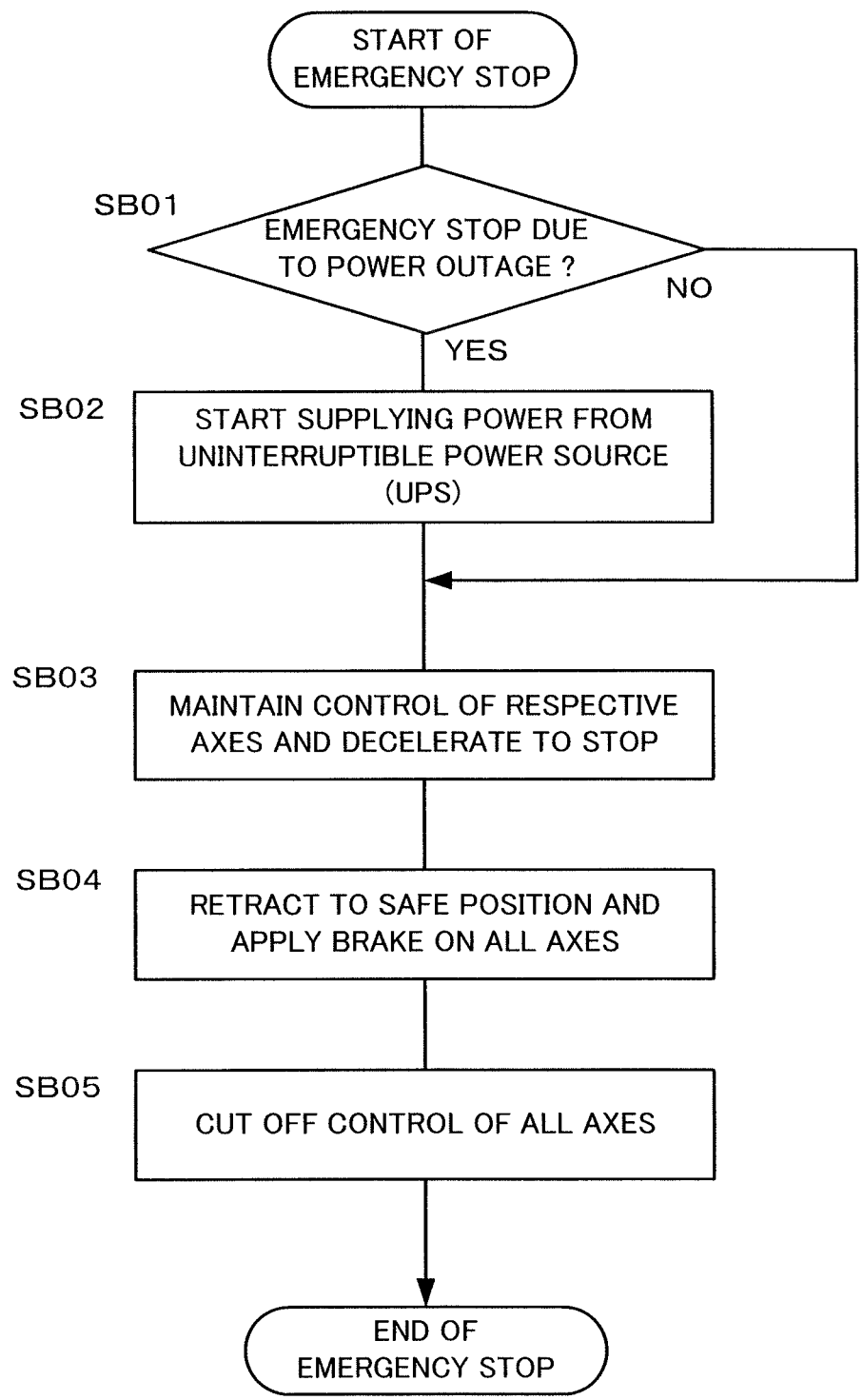
FIG. 24 is a flow chart of an emergency stop according to conventional art.

In a state in which the precision pressure-reducing valve 58 is connected to the air balance chamber 23 as in a case of the positioning device shown in FIG. 21, a distance of a retracting action of the movable part, a velocity of the movable part, and a driving force of the air balance are as illustrated by the graph in FIG. 23.

As described earlier, the precision pressure-reducing valve 58 always operates in a direction that suppresses a pressure variation of the air balance. Therefore, since the precision pressure-reducing valve 58 acts as an attenuating element of pressure fluctuation, the retracting action of the vertical axis, the velocity, and the driving force all become statically determinate (assume settled values with only minor fluctuation) after T' seconds. Since T' is actually 0.5 to 2.0 seconds, the throttle valve 56 shown in FIG. 18 need only be adjusted so as to delay actuation of the brake of the vertical axis by 2.0 seconds or more. Such an adjustment is not particularly difficult.

Since a retracting action is an operation that is executed by temporarily varying the pressure of the air balance, a pressure reducing valve that attempts to maintain a constant pressure of the air balance may seem like an obstruction to a retracting action of the movable part. Build up of pressure (driving force) of the air balance is most important for a retracting action of the movable part. It is safe to say that a retraction velocity is determined by the pressure (driving force) build up.

As is apparent from a comparison between the graph shown in FIG. 22 and the graph shown in FIG. 23, behaviors immediately following the start of an emergency stop are completely identical and an effect of a presence/absence of the pressure reducing valve 58 is not evident. This is because a response speed of the pressure reducing valve 58 slightly lags behind pressure variation. However, the pressure reducing valve 58 hardly obstructs a retracting action of the movable part due to this delay in response. Therefore, a retracting action may conceivably be performed without incident even if a pressure reducing valve is connected to the air balance.

As described above, by limiting a retracting action of a vertical axis to a drive direction of the vertical axis and, in particular, to an upward retracting action of the vertical axis, a positioning device according to the present invention can achieve a simple and highly reliable retracting action of the vertical axis during an emergency stop without having to add expensive devices. In addition, the present invention is superior in principle than conventional systems in that the retracting action can be performed with a greater force than a driving force of a motor.

What is claimed is:

1. A positioning device comprising:
   a servo motor that drives a vertical axis;
   a controller that controls the servo motor;
   an air balance that cancels a self-weight of the vertical axis, the positioning device further comprising:
   an air supply source that supplies air to the air balance;
   a pressure regulating device that regulates pressure of the air balance using air supplied from the air supply source; and
   an air balance pressure modifying unit that modifies the pressure of the air balance and moves the vertical axis in a direction which enables avoiding a collision between a structure that moves with the vertical axis and another structure or reducing a collision therebetween, when an excitation of the servo motor is released due to an emergency stop, a power outage, or another operation performed on the positioning device;
   wherein the air balance pressure modifying unit generates a force that is equal to or greater than a thrust of the servo motor due to a pressure variation of the air balance.

2. The positioning device according to claim 1, wherein the air balance pressure modifying unit is a pressure regulating device connected to the air balance.

3. The positioning device according to claim 1, wherein the air balance pressure modifying unit is configured from an air tank capable of accumulating a certain amount of air at a pressure that is higher or lower than a pressure of the air balance and a valve, and the air tank is connected to the air balance by a piping via the valve.

4. The positioning device according to claim 1, wherein
   the vertical axis includes a braking device in which a brake is released when air pressure is supplied and the brake is actuated when air pressure is released, the air supplied to the braking device being supplied via a valve from an air supply having a pressure that is sufficiently higher than the pressure of the air balance, and
   the valve includes an exhaust port for releasing residual pressure when the valve is closed, and a pipe line is provided through which residual pressure of the braking device flows into the air balance via the exhaust port when the valve is closed.

5. The positioning device according to claim 4, further comprising at least one linear axis or a rotary axis besides the vertical axis,
   wherein the linear axis or the rotary axis includes a braking device in which a brake is released when air pressure is supplied and the brake is actuated when air pressure is released, the respective valves open and close simultaneously, and a pipe line is provided through which residual pressure of the respective brakes flows into the air balance via the exhaust port when the valves are closed.

6. The positioning device according to claim 5, wherein at least one of air pipings that connect the braking device with the valve is structured so as to be capable of accumulating air inside the piping.

7. The positioning device according to claim 4, wherein the braking device of the vertical axis is structured so that a throttle valve is attached to a pipe line of air discharged when the brake is actuated and that an actuation time of the brake of the vertical axis is delayed by restricting a flow velocity of the discharged air.

8. The positioning device according to claim 1, wherein the valve is a solenoid valve so that when power of the solenoid valve is turned on, air is supplied to the braking device to release the brake, and when the solenoid valve is turned off, the brake is actuated.

9. The positioning device according to claim 1, wherein the air balance is connected to a secondary side of a precision pressure-reducing valve, and pressure is regulated so that the pressure of the air balance becomes constant.

* * * * *